United States Patent
Xi et al.

(10) Patent No.: US 11,334,740 B2
(45) Date of Patent: May 17, 2022

(54) CIRCUIT, STRUCTURE, AND DEVICE FOR FINGERPRINT RECOGNITION, DISPLAY PANEL, AND DISPLAY DEVICE

(71) Applicants: Shanghai Tianma Micro-Electronics Co., Ltd., Shanghai (CN); Shanghai AVIC OPTO Electronics Co., Ltd., Shanghai (CN)

(72) Inventors: Kerui Xi, Shanghai (CN); Tingting Cui, Shanghai (CN); Feng Qin, Shanghai (CN); Xuhui Peng, Shanghai (CN); Linzhi Wang, Shanghai (CN)

(73) Assignees: Shanghai Tianma Micro-Electronics Co., Ltd., Shanghai (CN); Shanghai AVIC OPTO Electronics Co., Ltd., Shanghai (CN)

( * ) Notice: Subject to any disclaimer, the term of this patent is extended or adjusted under 35 U.S.C. 154(b) by 0 days.

(21) Appl. No.: 16/910,840

(22) Filed: Jun. 24, 2020

(65) Prior Publication Data
US 2021/0334494 A1    Oct. 28, 2021

(30) Foreign Application Priority Data
Apr. 28, 2020   (CN) .......................... 202010350153.4

(51) Int. Cl.
*G06K 9/00* (2006.01)
*G06F 3/044* (2006.01)

(52) U.S. Cl.
CPC ......... *G06K 9/0002* (2013.01); *G06F 3/0445* (2019.05)

(58) Field of Classification Search
CPC .. G06K 9/00006–00093; G06K 9/0002; G06F 3/0412; G06F 3/044–0448; G06F 2203/04103; G06F 3/0445; H01L 27/00–3297; H01L 27/323; H01L 27/3225–3234; H01L 27/3276
See application file for complete search history.

(56) References Cited

U.S. PATENT DOCUMENTS

| | | | | |
|---|---|---|---|---|
| 2008/0055809 A1* | 3/2008 | Miyazawa | ........... | G06K 9/0002 361/100 |
| 2015/0331508 A1* | 11/2015 | Nho | ...................... | G06F 3/0445 345/173 |
| 2017/0168636 A1* | 6/2017 | Xi | ...................... | G06F 3/04166 |
| 2018/0060641 A1* | 3/2018 | Kim | ...................... | G06K 9/0004 |

(Continued)

FOREIGN PATENT DOCUMENTS

CN            104866834 A        8/2015

*Primary Examiner* — Amr A Awad
*Assistant Examiner* — Aaron Midkiff
(74) *Attorney, Agent, or Firm* — Anova Law Group, PLLC

(57) ABSTRACT

Fingerprint recognition circuit, fingerprint recognition structure, fingerprint recognition device, display panel, and display device are provided. The circuit includes: a fingerprint recognition driving transistor; a first capacitor; a driving signal input terminal; and a sensing signal output terminal. The first capacitor has a terminal electrically connected to a gate of the fingerprint recognition driving transistor and another terminal electrically connected to a ground. The driving signal input terminal is electrically connected to an input terminal of the fingerprint recognition driving transistor. An output terminal of the fingerprint recognition driving transistor is electrically connected to the sensing signal output terminal.

19 Claims, 18 Drawing Sheets

(56) References Cited

U.S. PATENT DOCUMENTS

2019/0250764 A1* 8/2019 Kim .................. G06K 9/0002
2019/0325189 A1* 10/2019 Sun .................. G09G 3/3258
2020/0321405 A1* 10/2020 Kang .................. G06F 3/0448

* cited by examiner

CIRCUIT, STRUCTURE, AND DEVICE FOR FINGERPRINT RECOGNITION, DISPLAY PANEL, AND DISPLAY DEVICE

CROSS-REFERENCES TO RELATED APPLICATION

This application claims the priority of Chinese Patent Application No. 202010350153.4, filed on Apr. 28, 2020, the content of which is incorporated herein by reference in its entirety.

TECHNICAL FIELD

The present disclosure generally relates to the field of fingerprint recognition technology and, more particularly, relates to a fingerprint recognition circuit, a fingerprint recognition structure, a fingerprint recognition device, a display panel, and a display device.

BACKGROUND

Fingerprint recognition technology may be used to collect images of human fingerprints through fingerprint sensors, and then compare the images with preset fingerprint information, to achieve verification of identification. The fingerprint recognition technology has been widely used in various fields including public security, customs, building access control, or personal electronic devices.

Fingerprint recognition sensors are mainly include capacitive fingerprint sensors and optical fingerprint sensors. A mainstream of the capacitive fingerprint sensor includes silicon-based semiconductor fingerprint sensors. A silicon-based semiconductor fingerprint sensor is generally prepared using a silicon-based semiconductor. A capacitive fingerprint sensor includes a capacitive sensing array. When a finger presses, the capacitive sensing array may generate different induced charges according to ridges and valleys of the finger, thereby forming a fingerprint image. Because of the high cost, the silicon-based semiconductor fingerprint sensors is not suitable for the needs of large-area fingerprint recognition. For optical fingerprint sensors, because photosensitive elements need to be formed, the process is complicated, and the number of processes is large.

Thus, there is a need to provide a fingerprint recognition sensor with a simple structure, a low cost, and suitable for the large-area fingerprint recognition.

SUMMARY

One aspect of the present disclosure provides a fingerprint recognition circuit. The circuit includes: a fingerprint recognition driving transistor; a first capacitor; a driving signal input terminal; and a sensing signal output terminal. For the first capacitor, a terminal is electrically connected to a gate of the fingerprint recognition driving transistor and another terminal is electrically connected to a ground. The driving signal input terminal is electrically connected to an input terminal of the fingerprint recognition driving transistor. An output terminal of the fingerprint recognition driving transistor is electrically connected to the sensing signal output terminal.

Another aspect of the present disclosure provides a fingerprint recognition structure. The structure includes fingerprint recognition circuits. Each of the fingerprint recognition circuits includes: a fingerprint recognition driving transistor; a first capacitor; a driving signal input terminal; and a sensing signal output terminal. For the first capacitor, a terminal is electrically connected to a gate of the fingerprint recognition driving transistor and another terminal is electrically connected to a ground. The driving signal input terminal is electrically connected to an input terminal of the fingerprint recognition driving transistor. An output terminal of the fingerprint recognition driving transistor is electrically connected to the sensing signal output terminal.

Another aspect of the present disclosure provides a fingerprint recognition device. The device includes a fingerprint recognition structure. The structure includes fingerprint recognition circuits. Each of the fingerprint recognition circuits includes: a fingerprint recognition driving transistor; a first capacitor; a driving signal input terminal; and a sensing signal output terminal. For the first capacitor, a terminal is electrically connected to a gate of the fingerprint recognition driving transistor and another terminal is electrically connected to a ground. The driving signal input terminal is electrically connected to an input terminal of the fingerprint recognition driving transistor. An output terminal of the fingerprint recognition driving transistor is electrically connected to the sensing signal output terminal.

Another aspect of the present disclosure provides a display panel. The display panel includes a fingerprint recognition structure. The structure includes fingerprint recognition circuits. Each of the fingerprint recognition circuits includes: a fingerprint recognition driving transistor; a first capacitor; a driving signal input terminal; and a sensing signal output terminal. For the first capacitor, a terminal is electrically connected to a gate of the fingerprint recognition driving transistor and another terminal is electrically connected to a ground. The driving signal input terminal is electrically connected to an input terminal of the fingerprint recognition driving transistor. An output terminal of the fingerprint recognition driving transistor is electrically connected to the sensing signal output terminal.

Another aspect of the present disclosure provides a display device. The display device includes a display panel. The display panel includes a fingerprint recognition structure. The structure includes fingerprint recognition circuits. Each of the fingerprint recognition circuits includes: a fingerprint recognition driving transistor; a first capacitor; a driving signal input terminal; and a sensing signal output terminal. For the first capacitor, a terminal is electrically connected to a gate of the fingerprint recognition driving transistor and another terminal is electrically connected to a ground. The driving signal input terminal is electrically connected to an input terminal of the fingerprint recognition driving transistor. An output terminal of the fingerprint recognition driving transistor is electrically connected to the sensing signal output terminal.

Other aspects or embodiments of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
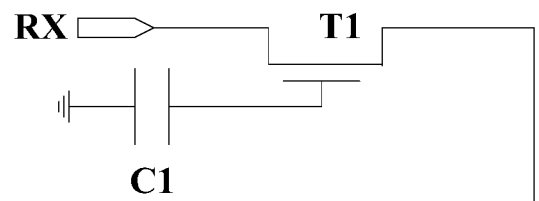
FIG. 1 illustrates an effective circuit diagram of an exemplary fingerprint recognition circuit consistent with various disclosed embodiments in the present disclosure.

Reference will now be made in detail to exemplary embodiments of the disclosure, which are illustrated in the accompanying drawings. Hereinafter, embodiments consistent with the disclosure will be described with reference to drawings. In the drawings, the shape and size may be exaggerated, distorted, or simplified for clarity. Wherever possible, the same reference numbers will be used throughout the drawings to refer to the same or like parts, and a detailed description thereof may be omitted.

Further, in the present disclosure, the disclosed embodiments and the features of the disclosed embodiments may be combined under conditions without conflicts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

Moreover, the present disclosure is described with reference to schematic diagrams. For the convenience of descriptions of the embodiments, the cross-sectional views illustrating the device structures may not follow the common proportion and may be partially exaggerated. Besides, those schematic diagrams are merely examples, and not intended to limit the scope of the disclosure. Furthermore, a three-dimensional (3D) size including length, width, and depth should be considered during practical fabrication.

The present disclosure provides a fingerprint recognition circuit. FIG. 1 illustrates an effective circuit diagram of an exemplary fingerprint recognition circuit provided by one embodiment of the present disclosure. As illustrated in FIG. 1, the fingerprint recognition circuit may include: a fingerprint recognition driving transistor T1, a first capacitor C1, a driving signal input terminal TX, and a sensing signal output terminal RX. A terminal of the first capacitor C1 may be electrically connected to a gate of the fingerprint recognition driving transistor T1, and another terminal of the first capacitor C1 may be electrically connected to the ground. The driving signal input terminal TX may be electrically connected to an input terminal of the fingerprint recognition driving transistor T1, and an output terminal of the fingerprint recognition driving transistor T1 may be electrically connected to the sensing signal output terminal.

A plate of the first capacitor C1 electrically connected to the gate of the fingerprint recognition driving transistor T1 may be used as a sensing electrode. When the sensing electrode is touched by a finger, ridges and valleys of the finger may induce different amounts of induced charges on the sensing electrode. The sensing electrode may be electrically connected to the gate of the fingerprint recognition driving transistor T1, and induced charges in a source layer of the fingerprint recognition driving transistor may affect a conducting resistance of the fingerprint recognition driving transistor T1 in the fingerprint recognition circuit. When driving signals are provided to the fingerprint recognition driving transistor T1 in the fingerprint recognition circuit through the driving signal input terminal TX, sensing signals output by the output terminal of the fingerprint recognition driving transistor T1 may be different for the ridges and valleys of the finger, since the induced charges of the ridges and valleys of the finger affect the conducting resistance of the fingerprint recognition driving transistor T1 in the fingerprint recognition circuit. Correspondingly, different positions corresponding to the ridges or the valleys of the finger may be distinguished by detecting and analyzing the sensing signals, to achieve fingerprint recognition.

In the present disclosure, the fingerprint recognition circuit may have a simple structure, and may not need to be formed based on the silicon-based materials in existing technology. For example, the source layer in the fingerprint recognition driving transistor in the fingerprint recognition circuit may be made of a material including amorphous silicon. A cost for large-area fabrication may be reduced. Correspondingly, the fingerprint recognition circuit provided by various embodiments of the present disclosure may be suitable for needs of large-area fingerprint recognition including palm recognition or multi-person fingerprint recognition.

Figure 2:
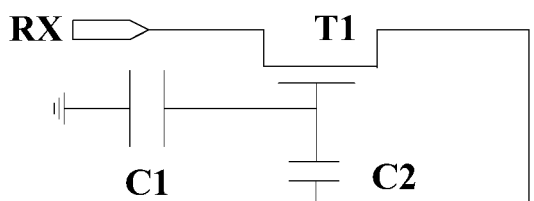
FIG. 2 illustrates an effective circuit diagram of another exemplary fingerprint recognition circuit consistent with various disclosed embodiments in the present disclosure.

FIG. 2 illustrates an effective circuit diagram of another exemplary fingerprint recognition circuit provided by the present disclosure. As illustrated in FIG. 2, in one embodiment, the fingerprint recognition circuit may further include a second capacitor C2. A terminal of the second capacitor C2 may be electrically connected to the driving signal input terminal TX, and another terminal of the second capacitor C2 may be electrically connected to the gate of the fingerprint recognition driving transistor T1. The amount of the induced charges on the sensing electrode induced by the finger may be small and may not effectively adjust the conducting resistance of the fingerprint recognition driving transistor T1 in the fingerprint recognition circuit, since an area of the sensing electrode of the first capacitor C1 may be limited. In one embodiment, by disposing the second capacitor C2, when the driving signals are input through the input terminal of the fingerprint recognition driving transistor T1, the second capacitor C2 may affect a gate voltage of the fingerprint recognition driving transistor T1 and then the second capacitor C2 and the first capacitor C1 may together adjust the conducting resistance of the fingerprint recognition driving transistor T1 in the fingerprint recognition circuit.

Figure 3:
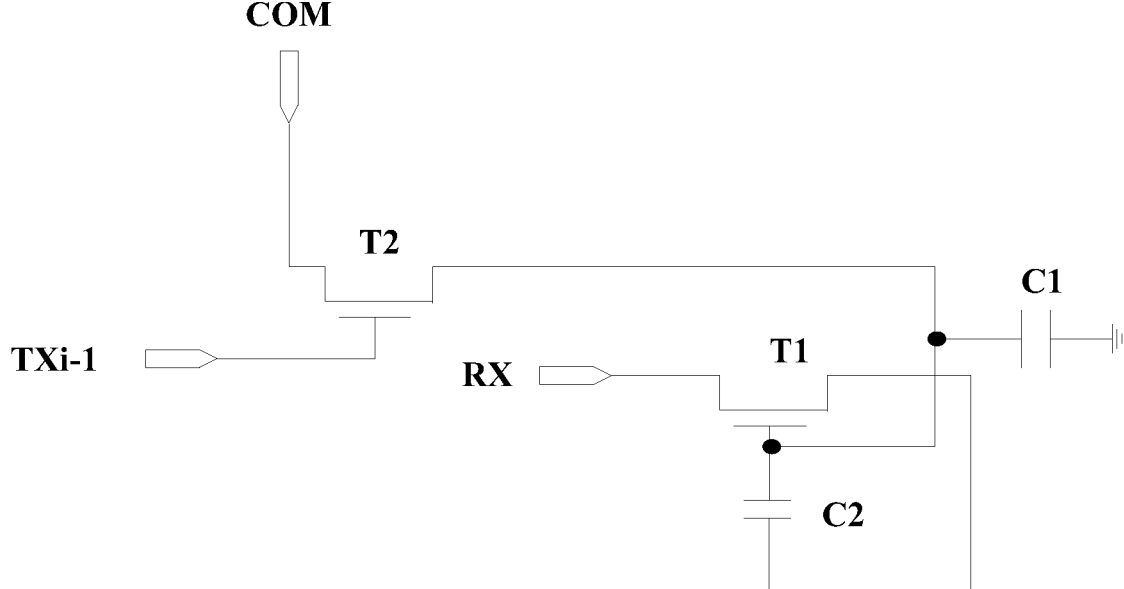
FIG. 3 illustrates an effective circuit diagram of another exemplary fingerprint recognition circuit consistent with various disclosed embodiments in the present disclosure.

In some other embodiments based on the above embodiments, the fingerprint recognition circuit may further include an initialization transistor optionally. FIG. 3 illustrates an effective circuit diagram of another exemplary fingerprint recognition circuit provided by the present disclosure. As illustrated in FIG. 3, in one embodiment, the fingerprint recognition circuit may further include an initialization transistor T2. An output terminal of the initialization transistor T2 may be electrically connected to the gate of the fingerprint recognition driving transistor T1. A system may include fingerprint recognition circuits of the fingerprint recognition circuit. A control terminal of an initialization transistor T2 of one of the fingerprint recognition circuits in an i-th row may be electrically connected to a signal output terminal $TX_{i-1}$ corresponding to one of the fingerprint recognition circuits in an (i−1)-th row, where i may be a positive integer larger than or equal to 2.

When forming a fingerprint recognition sensor, the fingerprint recognition circuits may be arranged in an array and each row of the fingerprint recognition circuits may scan row by row. To prevent a current fingerprint recognition from being affected by a voltage remaining on the sensing electrode from a previous fingerprint recognition or a voltage originally present on the sensing electrode, in one embodiment, the initialization transistor may initialize the sensing electrode. The control terminal of the initialization transistor T2 of one of the fingerprint recognition circuits in the i-th row may be electrically connected to the signal output terminal $TX_{i-1}$ corresponding to one of the fingerprint recognition circuits in the (i−1)-th row. Correspondingly, when the driving signals are input to one of the fingerprint recognition circuits in the (i−1)-th row, the initialization transistor T2 in one of the fingerprint recognition circuits in the i-th row may be turned on, to provide a common initialization signal to the input terminal of the initialization transistor T2 in one of the fingerprint recognition circuits in the i-th row. The sensing electrode of the first capacitor C1 in one of the fingerprint recognition circuits in the i-th row may be initialized and charges on the sensing electrode of the first capacitor C1 in one of the fingerprint recognition circuits in the i-th row may be cleared. That is, the common initialization signal COM may be written to the gate of the fingerprint recognition driving transistor T1 of one of the fingerprint recognition circuits in the i-th row.

In some other embodiments, an input terminal of an initialization transistor in each fingerprint recognition circuit may be provided with the common initialization signal. To reduce a number of wires, an input terminal of an initialization transistor in each of the fingerprint recognition circuits arranged in an array may be provided with the common initialization signal, and the common initialization signal may be input to the input terminal of the initialization transistor in each of the fingerprint recognition circuits through a common initialization signal line.

Figure 4:
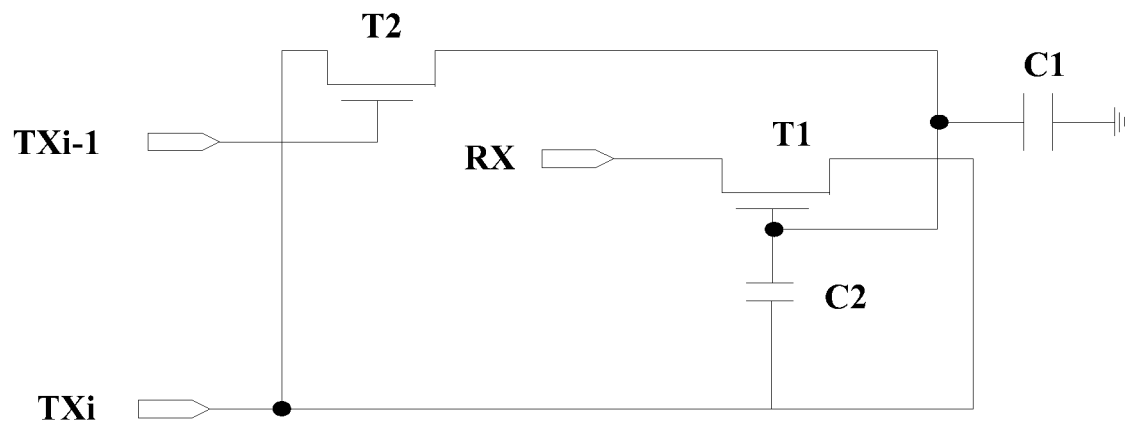
FIG. 4 illustrates an effective circuit diagram of another exemplary fingerprint recognition circuit consistent with various disclosed embodiments in the present disclosure.

The present disclosure provides another connection method for input terminals of initialization transistors. FIG. 4 illustrates an effective circuit diagram of another exemplary fingerprint recognition circuit provided by the present disclosure. As illustrated in FIG. 3, in one embodiment, an input terminal of an initialization transistor T2 may be electrically connected to a driving signal input terminal corresponding to the fingerprint recognition circuits in the current row. That is, an input terminal of an initialization transistor T2 of a fingerprint recognition circuit in the i-th row may be electrically connected to a driving signal input terminal $TX_i$ corresponding to the fingerprint recognition circuits in the i-th row.

Figure 5:
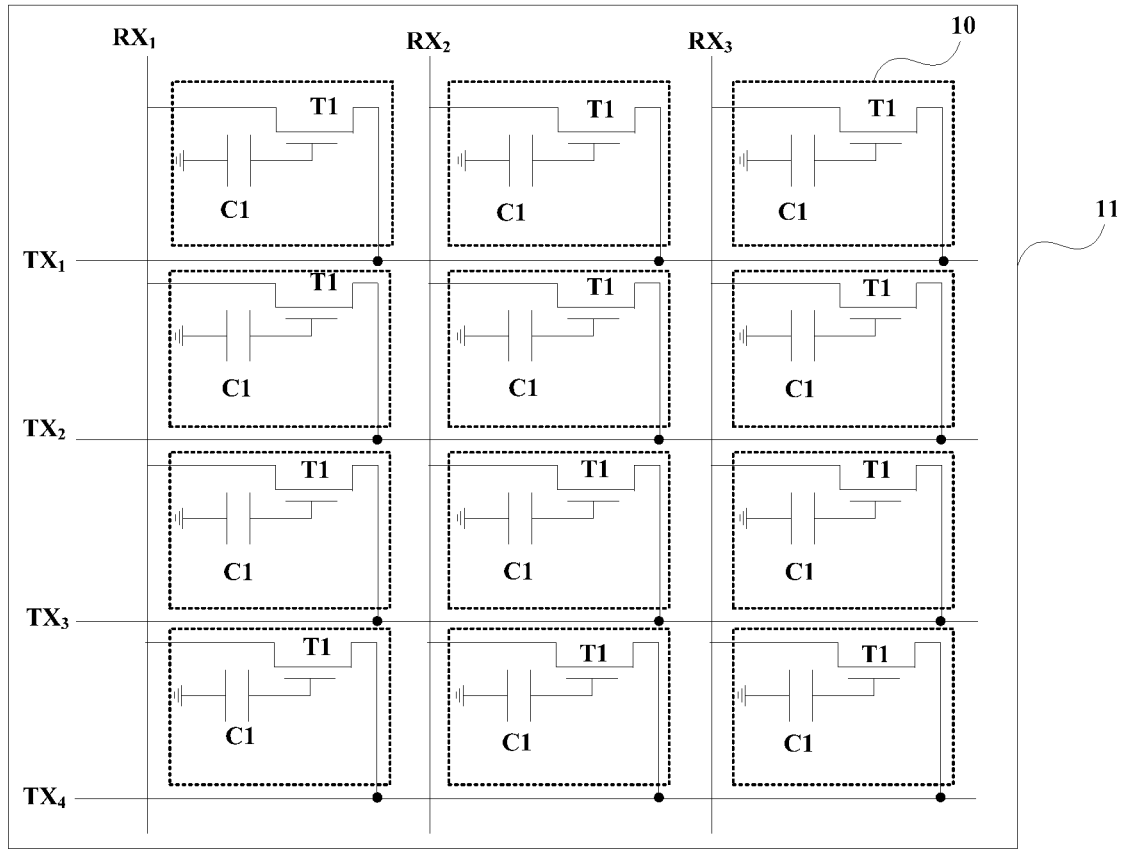
FIG. 5 illustrates an exemplary fingerprint recognition structure consistent with various disclosed embodiments in the present disclosure.

The present disclosure also provides a fingerprint recognition structure. The fingerprint recognition structure may include fingerprint recognition circuits provided by various embodiments of the present disclosure. The fingerprint recognition structure may be a module that can be packaged in a device. FIG. 5 illustrates a fingerprint recognition structure provided by one embodiment of the present disclosure. As illustrated in FIG. 5, the fingerprint recognition structure may include: a first substrate panel 11, a plurality of rows of driving signal lines TX and a plurality of columns of sensing signal lines RX disposed on a side of the first substrate plate 11. The plurality of driving signal lines TX may cross the plurality of sensing signal lines RX insulated to define a plurality of fingerprint recognition units (not shown in FIG. 5). Each fingerprint recognition unit of the plurality of fingerprint recognition units may include a fingerprint recognition circuit 10. In a fingerprint recognition circuit 10 corresponding to each of plurality of fingerprint recognition units, an input terminal of a fingerprint recognition driving transistor T1 may be electrically connected to one of the plurality of driving signal lines TX in a corresponding row, and an output terminal of the fingerprint recognition driving transistor T1 may be electrically connected to one of the plurality of sensing signal lines RX in a corresponding column. In one embodiment, the first substrate plate 11 may be a glass panel, and can be used to form the fingerprint recognition structure with a large area and may have a low cost. For description purposes only, the embodiment in FIG. 5 with four rows of driving signal lines TX and five columns of sensing signal lines RX is used as an example to illustrate the present disclosure and should not limit the scopes of the present disclosure. An i-th row of the plurality of rows of driving signal lines may be designated as TXi, and an i-th column of the plurality of columns of sensing signal lines may be designated as RXi. By providing the driving signals to the plurality of rows of driving signal lines TX row by row, and receiving the sensing signals from the plurality of columns of sensing signal lines RX, different positions where the finger touches may be determined to whether the positions are corresponding to the ridges or the valleys of the finger, to achieve fingerprint recognition.

Several structures of the film layers of the fingerprint recognition structure provided various embodiments of the present disclosure are illustrated below. For description purposes only, these embodiments are used as examples to illustrate the present disclosure and should not limit the scopes of the present disclosure.

Figure 6:
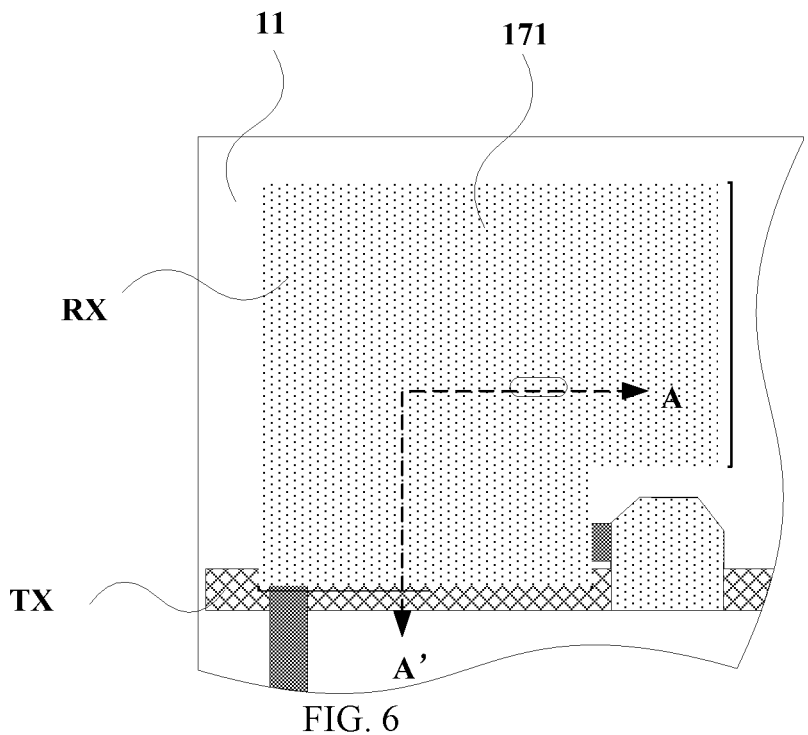
FIG. 6 illustrates a local top view of an exemplary fingerprint recognition structure consistent with various disclosed embodiments in the present disclosure.
Figure 7:
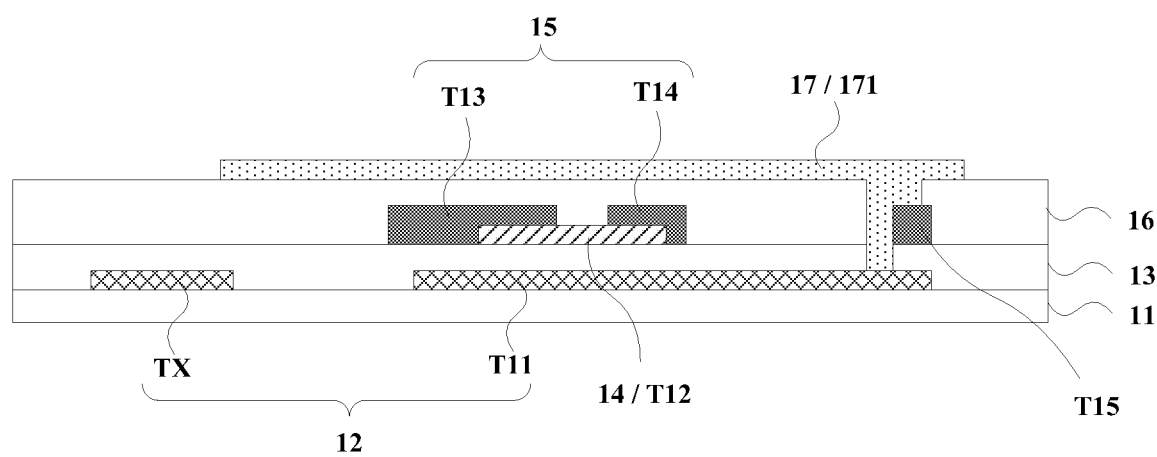
FIG. 7 illustrates a cross-sectional view along an A-A' direction in FIG. 6.
Figure 8:
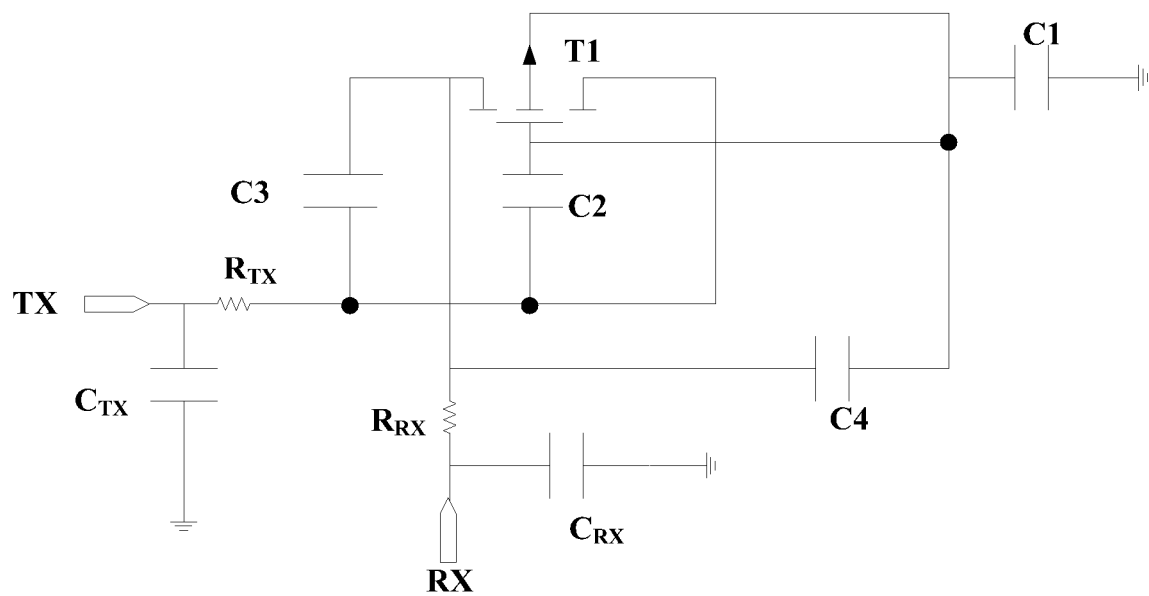
FIG. 8 illustrates an effective circuit diagram of the exemplary fingerprint recognition structure in FIG. 6.

FIG. 6 illustrates a local top view of an exemplary fingerprint recognition structure provided by one embodiment of the present disclosure, and FIG. 7 is a cross-section view along an A-A' direction in FIG. 6, and FIG. 8 is an effective circuit diagram of the fingerprint recognition structure in FIG. 6. As illustrated in FIGS. 6-8, in one fingerprint recognition circuit, C1 may be the first capacitor, that is, a capacitor of the sensing electrode relative to the ground, C2 may be an effective capacitor between the driving signal line TX and the sensing electrode. T1 may be the fingerprint recognition driving transistor, C3 may be an effective capacitor between the driving signal line TX and the sensing signal line RX, C4 may be an effective capacitor between the sensing signal line RX and the sensing electrode, RTX may be an effective resistor of the driving signal line TX, RRX may be an effective resistor of the sensing signal line RX, CTX may be an effective capacitor of the sensing signal line TX relative to the ground, CRX may be an effective capacitor of the driving signal line. In one embodiment, the fingerprint recognition structure may include a first substrate plate 11, a first conducting layer 12, a first insulating layer 13, a first semiconductor layer 14, a second conducting layer 15, a second insulating layer 16 and a third conducting layer 17. The first conducting layer 12 may be disposed on the first substrate plate 11. The first conducting layer 12 may include gates T11 of fingerprint recognition driving transistors T1 and a plurality of rows of driving signal lines TX. The first insulating layer 13 may be disposed at a surface of the first conducting layer 12 away from the first substrate plate 11. The first semiconductor layer 14 may be disposed at a side of the first insulating layer 13 away from the first conducting layer 12. The first semiconductor layer 14 may include source layers T12 of the fingerprint recognition driving transistors T1. The second conducting layer 15 may be disposed at a side of the first semiconductor layer 14 away from the first insulating layer 13. The second conducting layer 15 may include a plurality of columns of sensing signal lines RX, input terminals T13 and output terminals T14 of the fingerprint recognition driving transistors T1. For a fingerprint recognition driving transistor T1, an input terminal may be a source, and an output terminal may be a drain; or the input terminal may be the drain, and the output terminal may be the source. The second insulating layer 16 may be disposed at a side of the second conducting layer 15 away from the first insulating layer 13. The third conducting layer 17 may be disposed at a side of the second insulating layer 16 away from the second conducting layer 15. The third conducting layer 17 may include sensing electrodes 171. A sensing electrode 171 may be a plate of a corresponding first capacitor C1 electrically connected to the gate T11 of a corresponding fingerprint recognition driving transistor T1.

In one embodiment, the sensing electrode 171 may be electrically connected to the gate T11 of the corresponding fingerprint recognition driving transistor T1 through corresponding through holes in the first insulating layer 13 and in the second insulating layer 16. In some other embodiments illustrated in FIG. 7, the sensing electrode 171 may be electrically connected to the gate T11 of the corresponding fingerprint recognition driving transistor T1 through a conducting pad T15 disposed in a layer same as the input terminal T13 and the output terminal T14 of the corresponding fingerprint recognition driving transistor T1. When the sensing electrode 171 is electrically connected to the gate T11 of the corresponding fingerprint recognition driving transistor T1, after the finger touches the sensing electrode 171, the charges may induce a change of the conducting resistance of the source layer T12 in cooperation with the sensing electrode 171 and the gate T11. Accuracy of the fingerprint recognition may be improved significantly. In one embodiment, the conducting pad T15 in FIG. 7 may be made of a material same as the input terminal T13 and the output terminal T14 and may be disposed at the same layer of the input terminal T13 and the output terminal T14. When the sensing electrode 171 is made of a transparent conducting material, the conducting pad T15, the input terminal T13, and the output terminal T14 may be made of a metal material. By electrically connecting the sensing terminal 171 to the gate T11 of the corresponding fingerprint recognition driving transistor T1 through the conducting pad T15, the resistance may be reduced.

Figure 9:
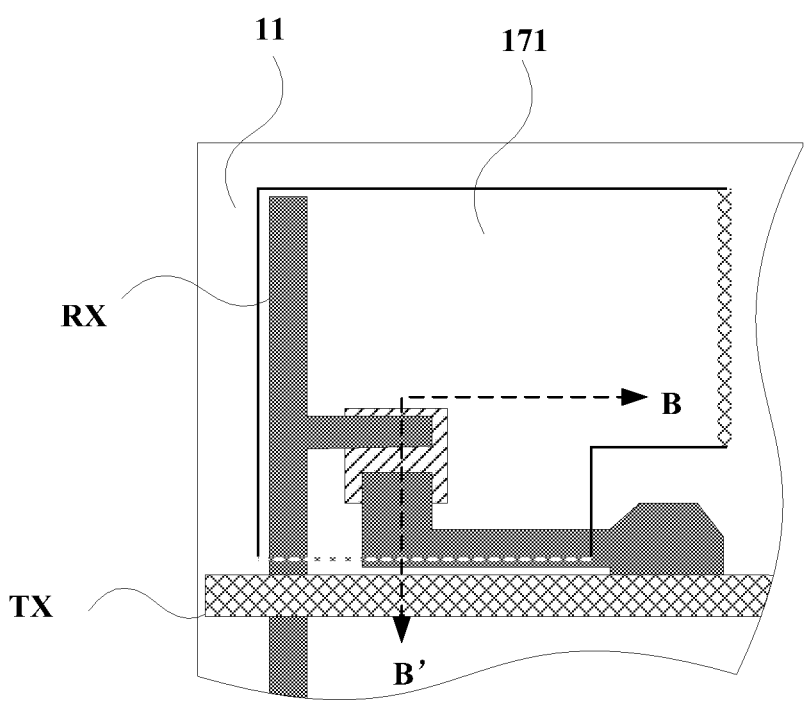
FIG. 9 illustrates a local top view of another exemplary fingerprint recognition structure consistent with various disclosed embodiments in the present disclosure.
Figure 10:
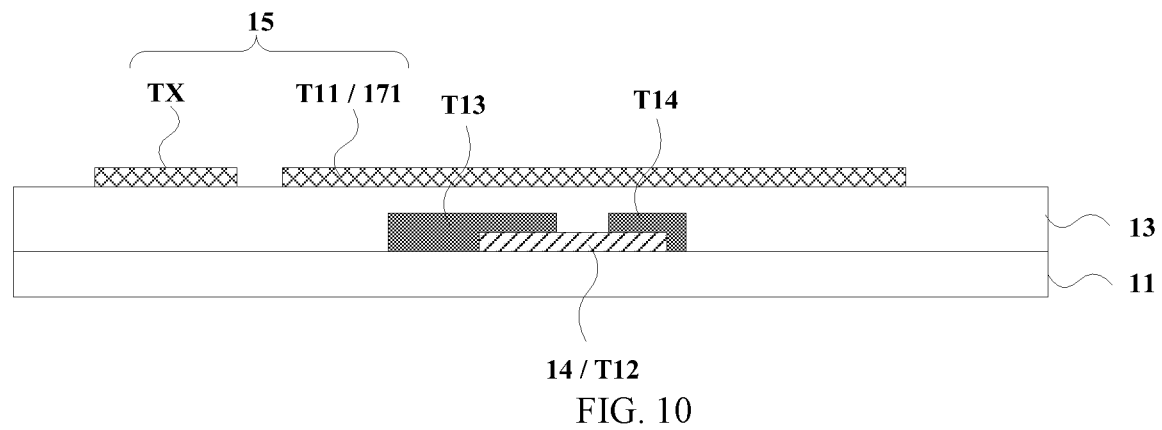
FIG. 10 illustrates a cross-sectional view along a B-B' direction in FIG. 9.

FIG. 9 illustrates a local top view of another exemplary fingerprint recognition structure provided by one embodiment of the present disclosure, and FIG. 10 is a cross-section view along a B-B' direction in FIG. 9. As illustrated in FIGS. 9-10, in another embodiment, the fingerprint recognition structure may include a first substrate plate 11, a first semiconductor layer 14, a first conducting layer 12, a first insulating layer 13 and a second conducting layer 15. The first semiconductor layer 14 may be disposed on the first substrate plate 11, and may include source layers T12 of the fingerprint recognition driving transistors T1. The first conducting layer 12 may be disposed on the first semiconductor layer 14. The first conducting layer 12 may include a plurality of columns of sensing signal lines RX, input terminals T13 and output terminals T14 of the fingerprint recognition driving transistors T1. The first insulating layer 13 may be disposed at a side of the first conducting layer 12 away from the first semiconductor layer 14. The second conducting layer 15 may include gates T11 of the fingerprint recognition driving transistors T1 and a plurality of rows of driving signal lines TX. The gates T11 of the fingerprint recognition driving transistors T1 may be multiplexed as sensing electrodes 171. A sensing electrode 171 may be a plate of the first capacitor C1 electrically connected to a gate T11 of a corresponding fingerprint recognition driving transistor T1. In the present disclosure, the gates T11 of the fingerprint recognition driving transistors T1 may be multiplexed as the sensing electrodes 171, and there may be no need to prepare the sensing electrodes 171 by an independent process. A number of the fabrication processes, a cost, a number of film layers of the fingerprint recognition structure, and a thickness of the fingerprint recognition structure may be reduced.

Figure 11:
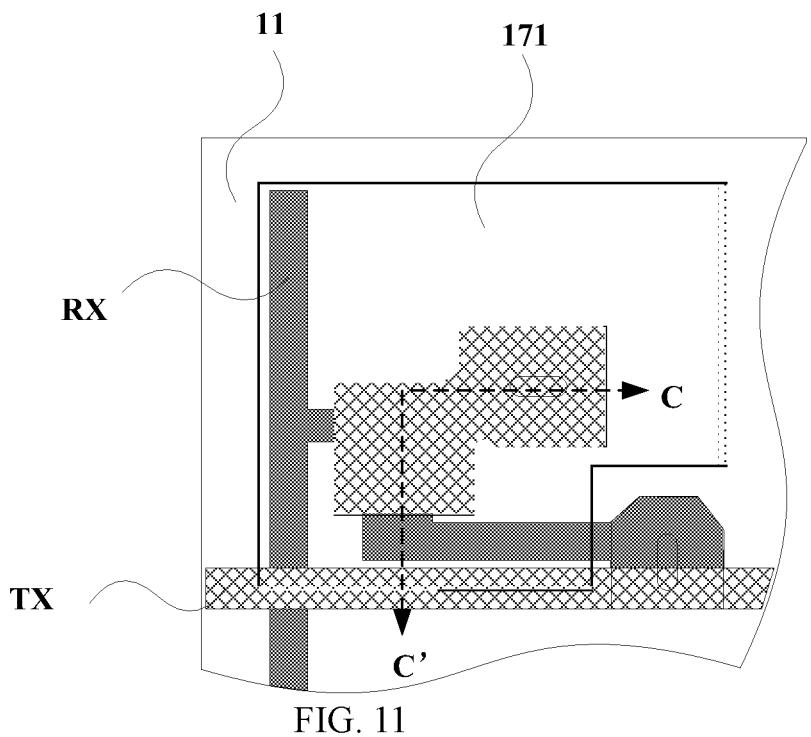
FIG. 11 illustrates a local top view of another exemplary fingerprint recognition structure consistent with various disclosed embodiments in the present disclosure.
Figure 12:
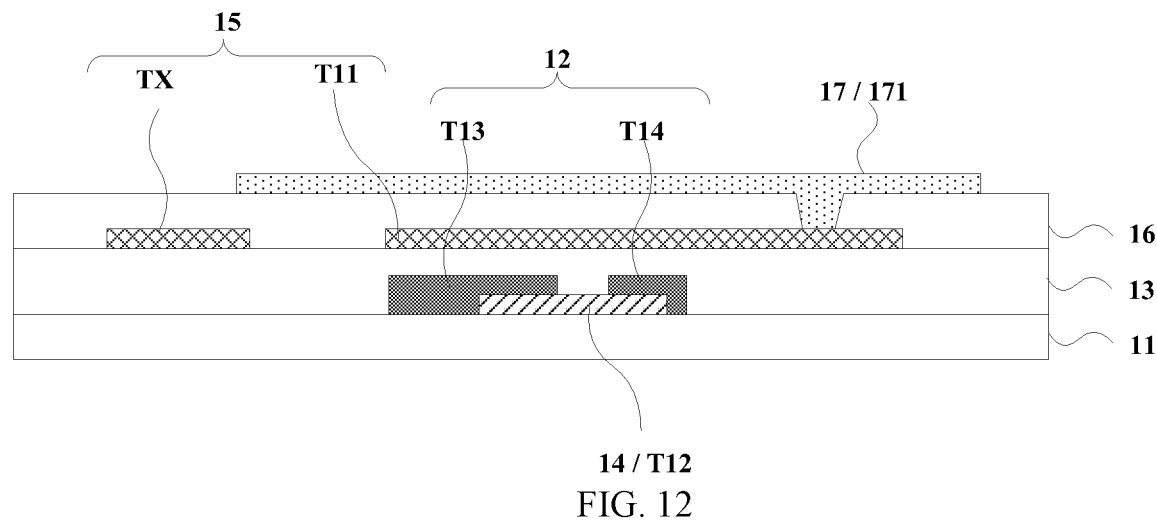
FIG. 12 illustrates a cross-sectional view along a C-C' direction in FIG. 9.

FIG. 11 illustrates a local top view of another exemplary fingerprint recognition structure provided by one embodiment of the present disclosure, and FIG. 12 is a cross-section view along a C-C' direction in FIG. 11. As illustrated in FIGS. 11-12, in another embodiment, the fingerprint recognition structure may include a first substrate plate 11, a first semiconductor layer 14, a first conducting layer 12, a first insulating layer 13, a second conducting layer 15, a second insulating layer 16, and a third conducting layer 17.

The first semiconductor layer 14 may be disposed on the first substrate plate 11, and may include source layers T12 of the fingerprint recognition driving transistors T1. The first conducting layer 12 may be disposed on the first semiconductor layer 14. The first conducting layer 12 may include a plurality of columns of sensing signal lines RX, input terminals T13 and output terminals T14 of the fingerprint recognition driving transistors T1. The first insulating layer 13 may be disposed at a side of the first conducting layer 12 away from the first semiconductor layer 14. The second conducting layer 15 may include gates T11 of the fingerprint recognition driving transistors T1 and a plurality of rows of driving signal lines TX. The second insulating layer 16 may be disposed at a side of the second conducting layer 15 away from the first insulating layer 13. The third conducting layer 17 may be disposed at a side of the second insulating layer 16 away from the second conducting layer 15, and may include sensing electrodes 171. A sensing electrode 171 may be a plate of the first capacitor C1 electrically connected to a gate T11 of a corresponding fingerprint recognition driving transistor T1.

Figure 13:
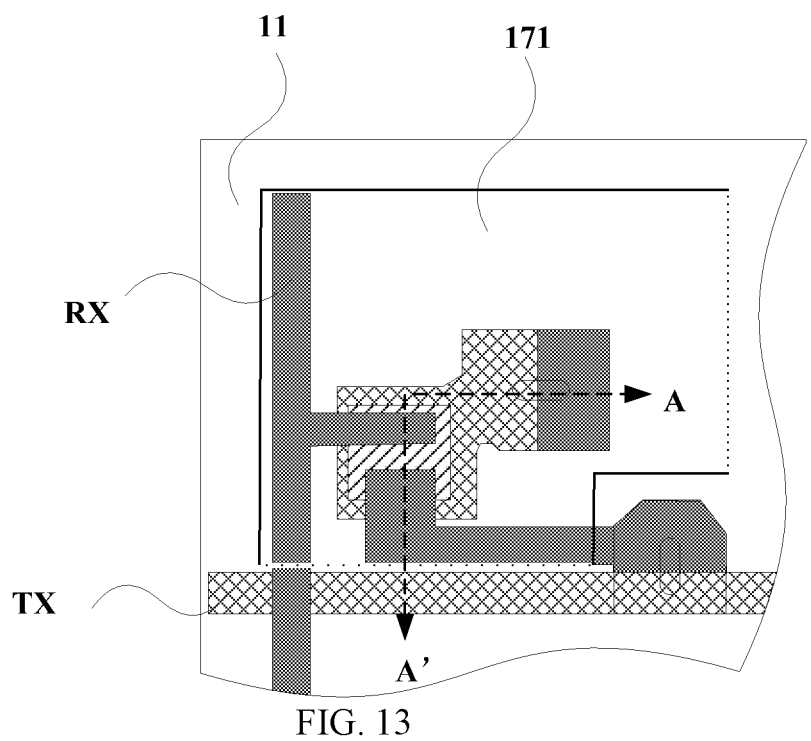
FIG. 13 illustrates a local top view of another exemplary fingerprint recognition structure consistent with various disclosed embodiments in the present disclosure.
Figure 14:
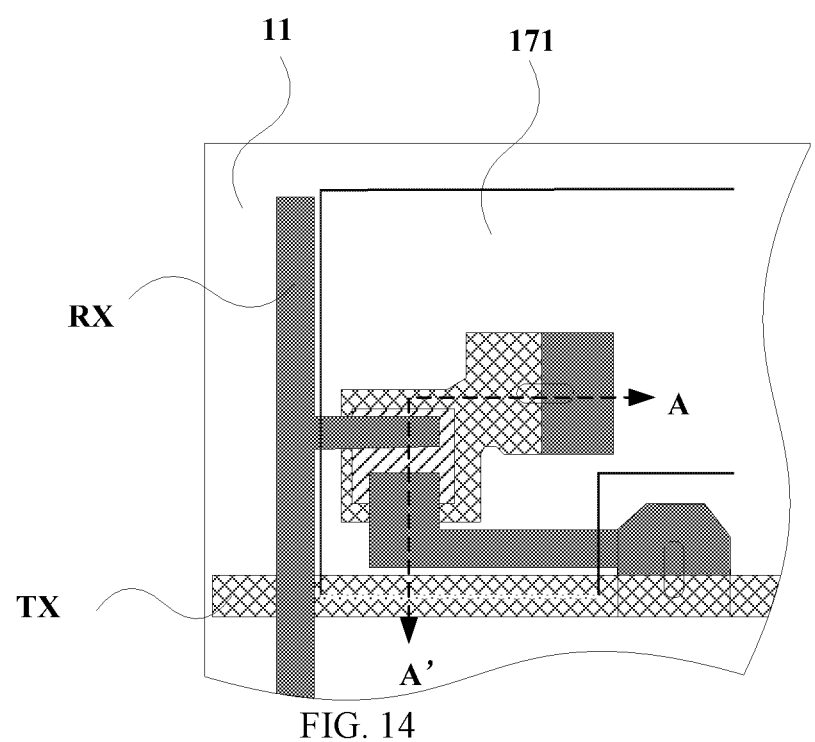
FIG. 14 illustrates a local top view of another exemplary fingerprint recognition structure consistent with various disclosed embodiments in the present disclosure.

In some other embodiments based on the above embodiments, the sensing electrodes 171 may not overlap the plurality of driving signal lines TX, and/or the sensing electrodes 171 may not overlap the plurality of sensing signal lines RX. In an embodiment illustrated in FIG. 13, the sensing electrodes 171 may not overlap the plurality of driving signal lines TX. In another embodiment illustrated in FIG. 14, the sensing electrodes 171 may not overlap the plurality of sensing signal lines RX. In some other embodiments, the sensing electrodes 171 may not overlap the plurality of driving signal lines TX, and the sensing electrodes 171 may not overlap the plurality of sensing signal lines RX.

When the sensing electrodes 171 overlap the plurality of driving signal lines TX, a capacitor may be formed between a sensing electrode 171 and a corresponding driving signal line TX of the plurality of driving signal lines TX, and the capacitor may affect charges on the sensing electrode. Correspondingly, a conducting resistance of a corresponding fingerprint recognition driving transistor T1 may be affected by induced charges of the finger relative to the sensing electrode and induced charge of the effective capacitor between the sensing electrode 171 and the corresponding driving signal line TX relative to the sensing electrode 171. When the area of the sensing electrode 171 is enough to satisfy the needs of the fingerprint recognition accuracy, the sensing electrode 171 may be configured to not overlap the corresponding driving signal line TX. Correspondingly, the fingerprint recognition signals may be prevented from being covered by capacitance signals between the sensing electrode 171 and the corresponding driving signal line TX. In real applications, the sensing electrode 171 may be configured to overlap or not overlap the corresponding driving signal line TX according to actual needs. For example, when the number of induced charges of the finger relative to the sensing electrode is small due to reasons including the area of the sensing electrode of the first capacitor C1 and cannot adjust the conducting resistance of the corresponding fingerprint recognition driving transistor T1 in the fingerprint recognition circuit, the sensing electrode 171 may be configured to overlap the corresponding driving signal line TX. In this case, the effective capacitor between the sensing electrode 171 and the corresponding driving signal line TX may be configured to be smaller than the capacitor of the sensing electrode relative to the ground, to prevent the fingerprint recognition signals from being covered by capacitance signals between the sensing electrode 171 and the corresponding driving signal line TX, and to prevent decreasing fingerprint recognition accuracy. When the area of the sensing electrode 171 in the first capacitor C1 is not limited in the product design, the sensing electrode 171 may be configured to not overlap the corresponding driving signal line TX.

The sensing signals on the plurality of sensing signal lines RX may change with respect to different finger touch positions. Correspondingly, when the sensing electrode 171 overlap the corresponding driving signal line TX, the capacitor between the sensing electrode 171 and the corresponding driving signal line TX may easily induce fingerprint recognition noise. In one embodiment, the sensing electrode 171 may be configured to not overlap the corresponding driving signal line TX.

Figure 15:
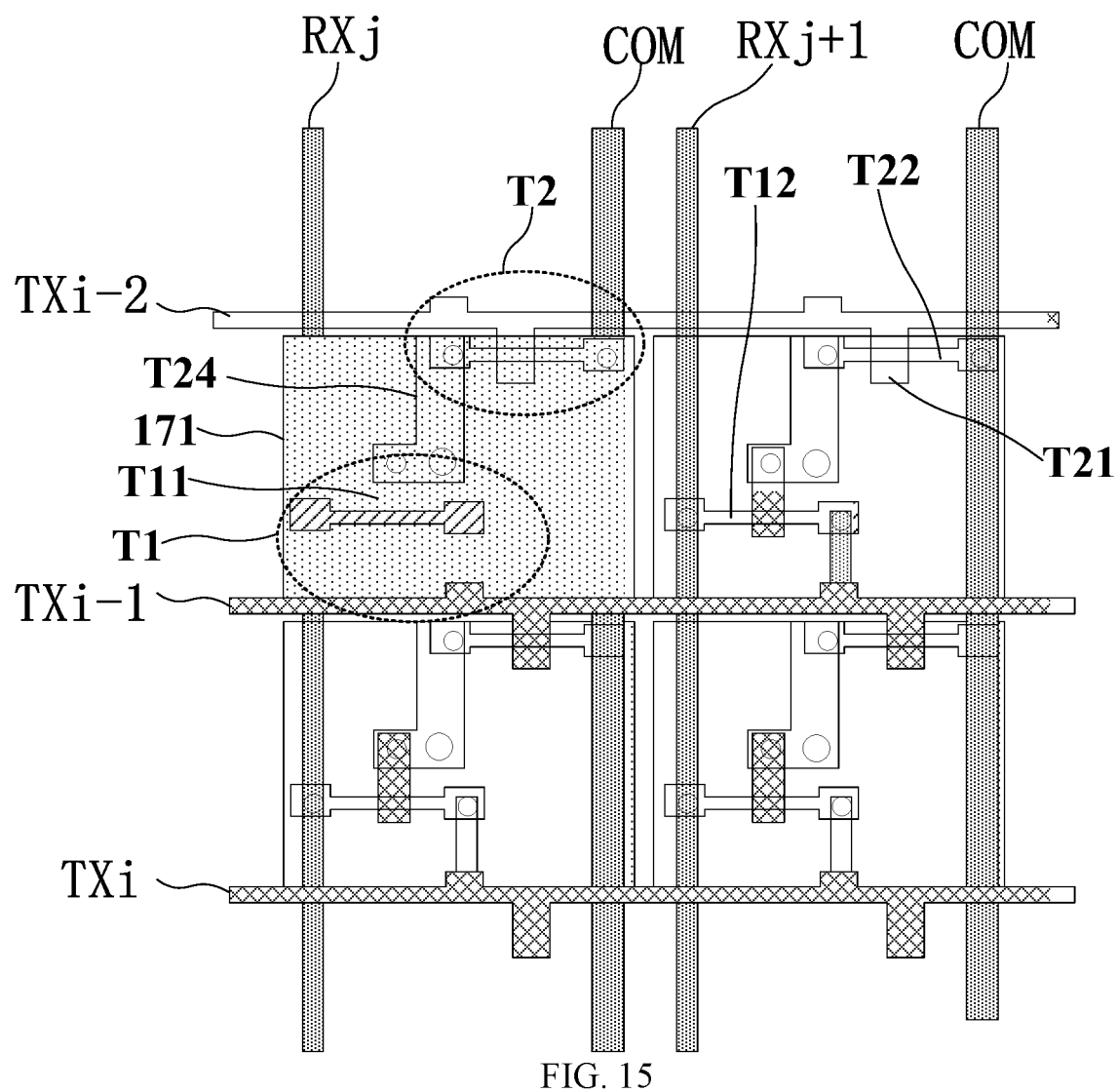
FIG. 15 illustrates a layout of an exemplary fingerprint recognition structure consistent with various disclosed embodiments in the present disclosure.
Figure 16:
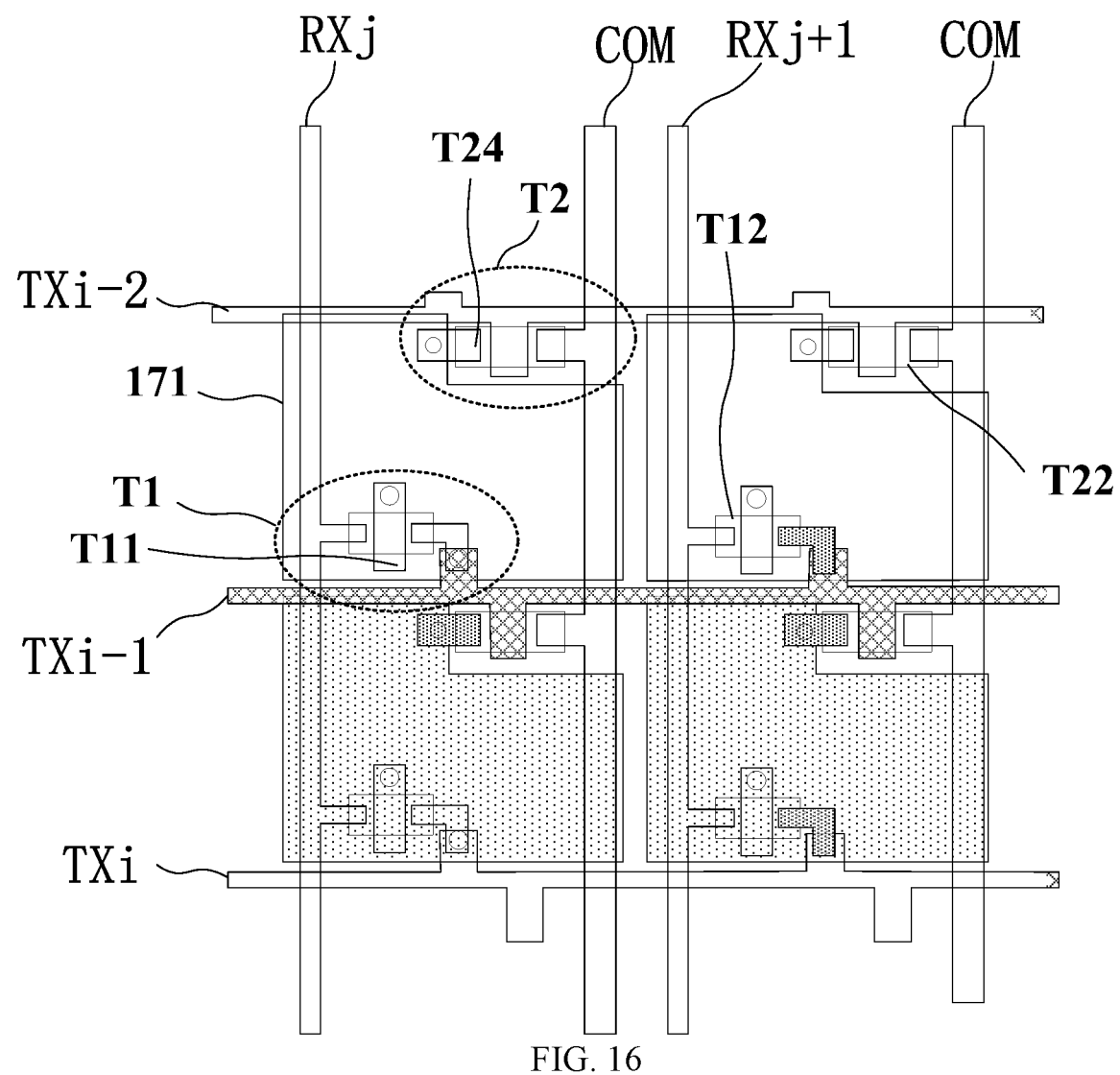
FIG. 16 illustrates a layout of another exemplary fingerprint recognition structure consistent with various disclosed embodiments in the present disclosure.

In one embodiment, a fingerprint recognition circuit may further include an initialization transistor, and an output terminal of the initialization transistor may be electrically connected to a sensing electrode. Control terminals of initialization transistors of the fingerprint recognition circuits in the i-th row may be electrically connected to the driving signal line corresponding to the fingerprint recognition circuits in the (i−1)-th row, where i may be a positive integer larger than or equal to 2. An input terminal of each initialization transistor may be electrically connected to a same common initialization signal line, as illustrated in FIG. 15. In each fingerprint recognition circuit, an output terminal T24 of an initialization transistor T2 may be electrically connected to a corresponding sensing electrode 171. The control terminals T21 of the initialization transistors T2 of the fingerprint recognition circuits in the i-th row may be electrically connected to the driving signal line $TX_{i-1}$ corresponding to the fingerprint recognition circuits in the (i−1)-th row. The control terminal T11 of a fingerprint recognition driving transistor T1 in each fingerprint recognition circuit may be electrically connected to a corresponding sensing electrode 171 through the output terminal T24 of a corresponding initialization transistor T2. The input terminal of each initialization transistor T2 may all be electrically connected to a same common initialization signal line COM. For the convenience of description, in the present disclosure, both the common initialization signal and the common initialization signal line are designated as COM. The sensing signal line corresponding to the fingerprint recognition circuits in the j-th row may be designated as RXj. In other embodiments, an output terminal T24 of an initialization transistor T2, a control terminal T11 of a fingerprint recognition driving transistor T1 in a corresponding fingerprint recognition circuit may be electrically connected to a corresponding sensing electrode 171 directly, as illustrated in FIG. 16.

Figure 17:
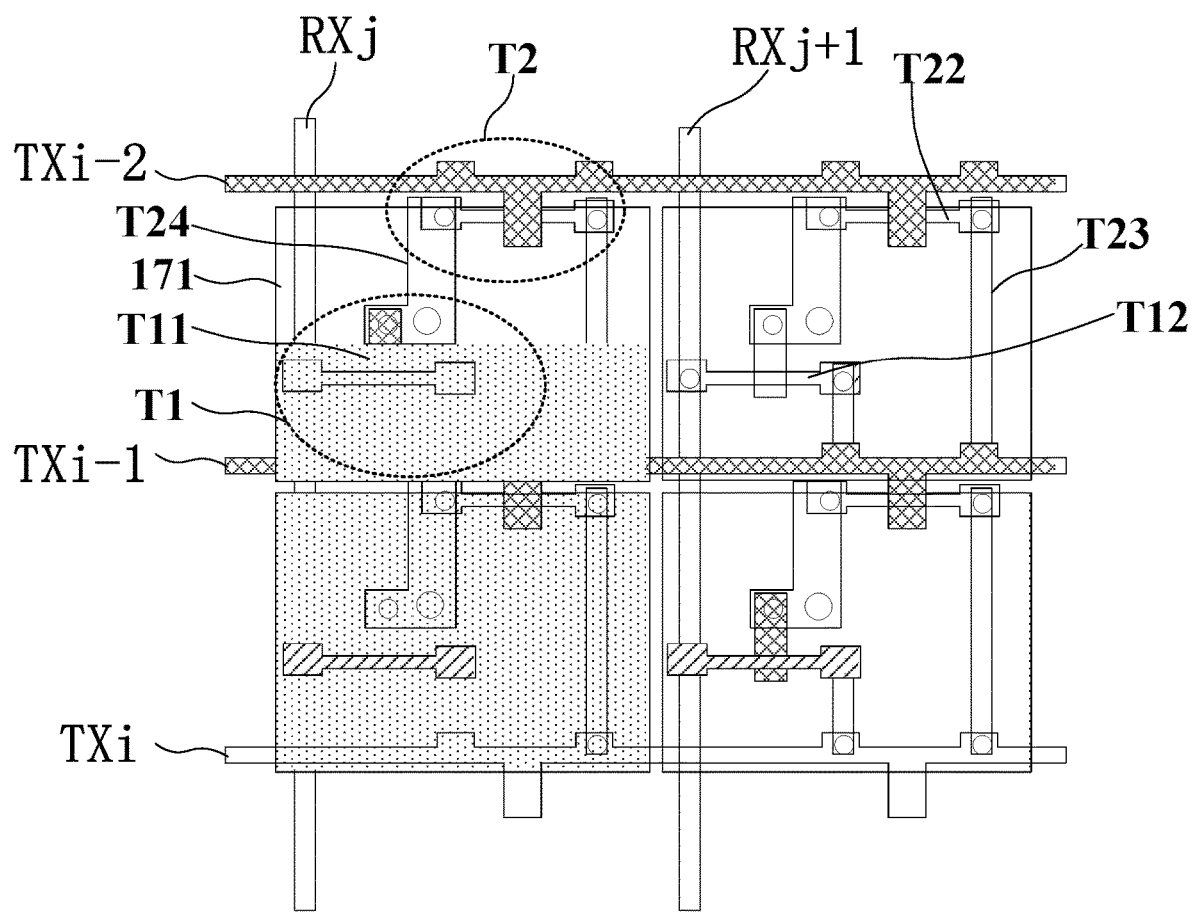
FIG. 17 illustrates a layout of another exemplary fingerprint recognition structure consistent with various disclosed embodiments in the present disclosure.

In some other embodiments, as illustrated in FIG. 17, an input terminal T23 of an initialization transistor may be electrically connected to a driving signal line corresponding to the fingerprint recognition circuits in the current row. That is, an input terminal T23 of an initialization transistor T2 of a fingerprint recognition circuit in the i-th row may be electrically connected to a driving signal line corresponding to the fingerprint recognition circuits in the i-th row. In FIG. 17, an output terminal T24 of an initialization transistor T2 may be electrically connected to a corresponding sensing electrode 171, a control terminal T11 of a fingerprint recognition driving transistor T1 of a fingerprint recognition circuit may be electrically connected to a corresponding sensing electrode 171 through an output terminal T24 of a corresponding initialization transistor T2. In some other embodiments, similar to FIG. 16, an output terminal T24 of an initialization transistor T2, a control terminal T11 of a fingerprint recognition driving transistor T1 in a corresponding fingerprint recognition circuit may be electrically connected to a corresponding sensing electrode 171 directly in FIG. 17. In FIGS. 15-17, A source layer of an initialization transistor T2 may be designated as T22, and T12 denotes a source layer of a fingerprint recognition driving transistor T1.

For the convenience of description, in the present disclosure, the driving signals, the driving signal lines, and the driving signal input terminals are all designated as TX; the sensing signals, the sensing signal lines, and the sensing signal output terminals are all designated as RX.

Figure 18:
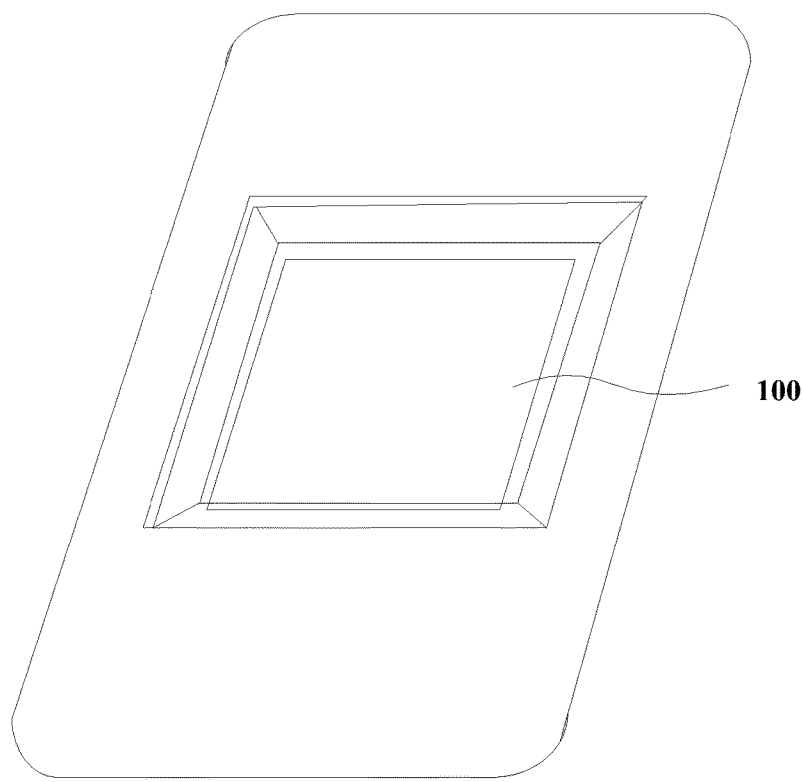
FIG. 18 illustrates an exemplary fingerprint recognition device consistent with various disclosed embodiments in the present disclosure.

The present disclosure also provides a fingerprint recognition device. As illustrated in FIG. 18, in one embodiment, the fingerprint recognition device may include any one fingerprint recognition structure 100 provided by various embodiments of the present disclosure. The fingerprint recognition device may be a device including a combination lock, a safe, a display device, or a fingerprint punch card machine. The fingerprint recognition device provided by the present disclosure may include any fingerprint recognition structure 100 provided by various embodiments of the present disclosure and may have benefits same as the fingerprint recognition structure described above.

The fingerprint recognition technology has been widely used in display fields, especially in fields of electronic devices with a display function including cell phones, notebooks, tablets, or digital cameras. Fingerprint recognition has become one of must-have functions of current display devices. The present invention further provides a display panel including a fingerprint identification structure provided by various embodiments of the present disclosure. In some embodiments, the fingerprint identification structure can be externally attached to an existing display panel in the form of a module, to form the display panel provided by the embodiments of the present disclosure. In some other embodiments, the fingerprint recognition structure may also be integrated inside the display panel, that is, the fingerprint identification structure may be formed at the same time during the preparation process of the display panel. The present invention does not limit the type of the display panel. For example, the display panel may be a liquid crystal display panel, an organic light-emitting display panel, a micro-light-emitting diode (LED) display panel, a mini-LED display panel, or a polymer liquid crystal display panel. The fingerprint recognition structure may be disposed in a display area of the display panel or in a non-display area of the display panel. Those skilled in the art can set the specific location of the fingerprint identification structure according to the design requirements of the panel.

Figure 19:
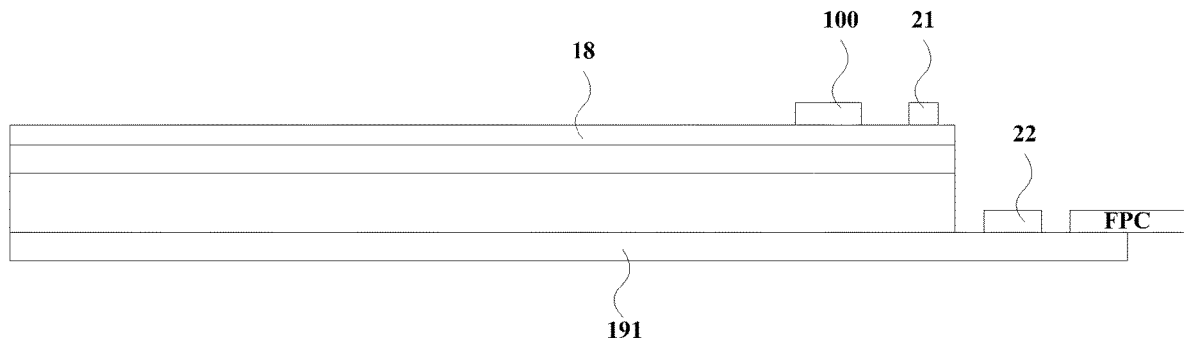
FIG. 19 illustrates an exemplary display panel consistent with various disclosed embodiments in the present disclosure.

In one embodiment, the display panel provided by the present disclosure may further include a cover plate, and the fingerprint recognition structure may be disposed at a side of the cover close to a light-emitting surface. The cover plate may be a cover plate of a liquid crystal display panel or a rigid package substrate plate of an organic light-emitting display panel. In the fabrication process, the fingerprint recognition structure may use the cover plate as the first substrate plate directly or the fingerprint recognition structure prepared previously may be attached to the cover plate. In some embodiments, as illustrated in FIG. 19, the display panel may further include two driving chips including a first driving chip 21 and a second driving chip 22. In one embodiment, the first driving chip 21 may be disposed on the cover plate 18, and the second driving chip 22 may be disposed on an array base plate 191 of the display panel. The first driving chip 21 may drive the fingerprint recognition structure 100 and the second driving chip 22 may drive the display panel to display. In some other embodiments, the positions of the two driving chips may be configured according to actual design requirements. In some other embodiments, the display panel may only include one driving chip, and the display function and the fingerprint recognition function may use the same driving chip. For example, the fingerprint recognition structure on the cover plate may be electrically connected to the driving chip on the array base plate through wires.

In some embodiments, when the display panel has a touch position detection function, a touch position detection module and the fingerprint recognition structure may be both integrated into the cover plate.

Figure 20:
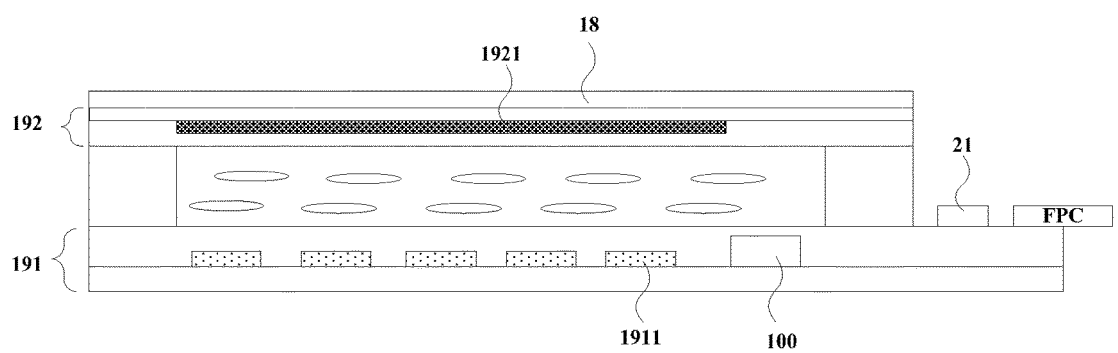
FIG. 20 illustrates another exemplary display panel consistent with various disclosed embodiments in the present disclosure.
Figure 21:
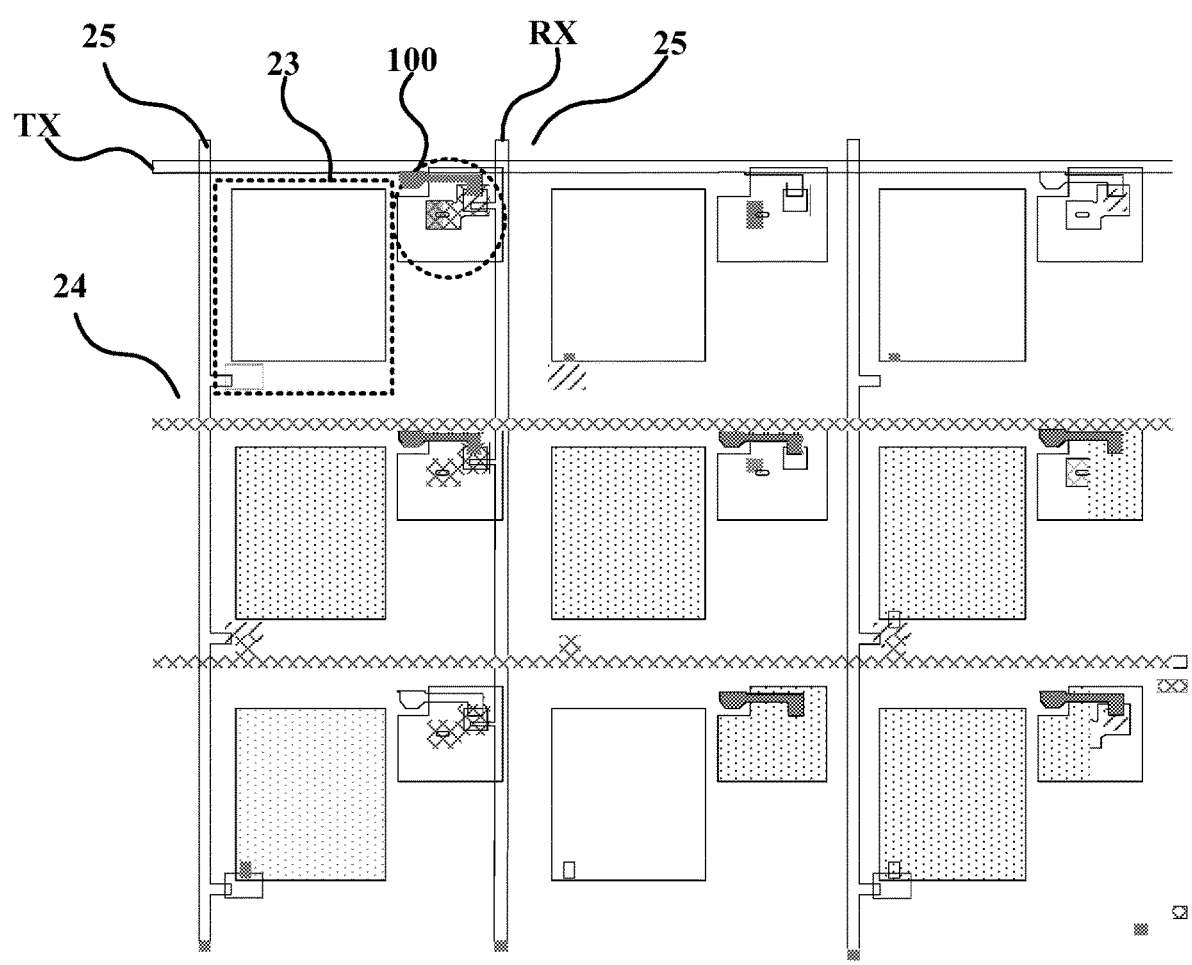
FIG. 21 illustrates a local top view of another exemplary display panel consistent with various disclosed embodiments in the present disclosure.

In some other embodiments, the fingerprint recognition structure may be integrated into the display panel, that is, the fingerprint recognition structure may be disposed between function film layers of the display panel, for example, on the array substrate plate of the display panel. FIG. 20 illustrates another display panel provided by another embodiment of the present disclosure. For description purposes only, the embodiment in FIG. 20 uses a liquid crystal display panel as an example to illustrate the present disclosure. The fingerprint recognition structure 100 may be disposed between a color film substrate plate 192 and the array substrate plate 191 of the display panel, and on the array substrate plate 191. Compared to the display panel where the fingerprint recognition structure is mounted externally on the display panel, the technical solution where the fingerprint recognition structure is integrated into the display panel may reduce a thickness of the display panel, to miniaturize the electronic device and improve the integration level. Also, a problem that the fingerprint recognition structure as an individual module is vulnerable to attack and violent disassembly may be avoided. In the embodiment illustrated in FIG. 20, the display panel may be a TN mode liquid crystal display panel. Pixel electrodes 1911 may be disposed in the array substrate plate 191, and a common electrode 1921 with a whole surface. To prevent the common electrode 1921 from shielding signals of the fingerprint recognition structure, the common electrode 1921 may expose the fingerprint recognition structure 100 in a direction perpendicular to the display panel. The first driving chip 21 may be disposed on the array substrate plate 191. The fingerprint recognition function and the display function may share the first driving chip 21.

Figure 22:
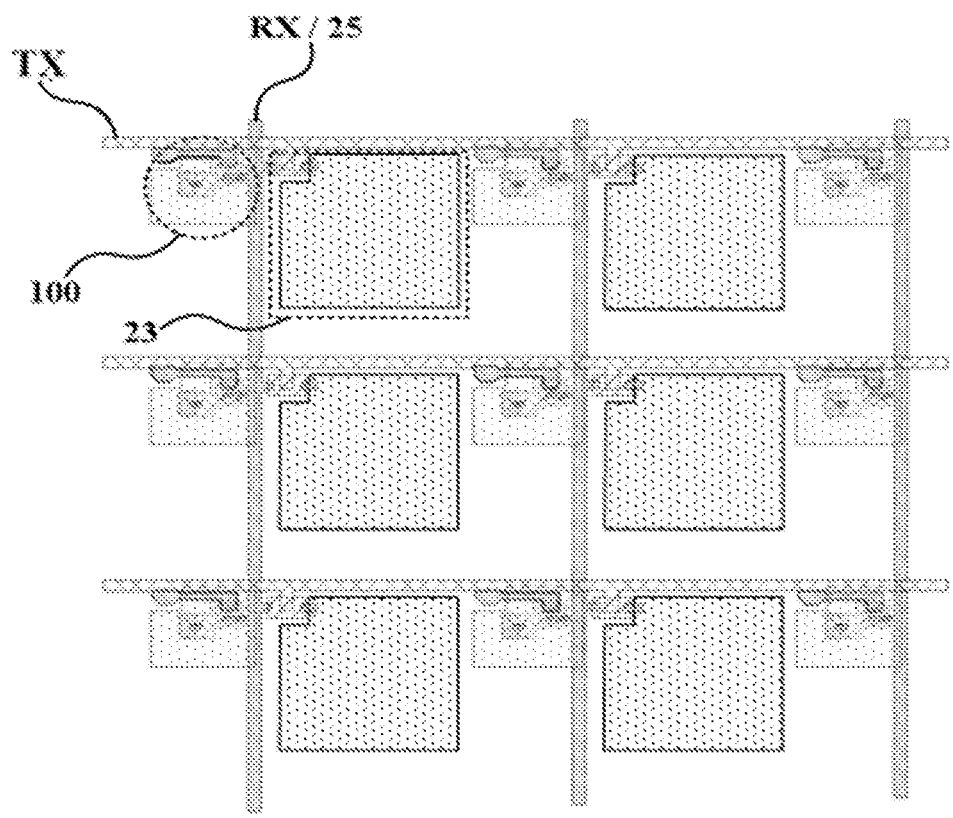
FIG. 22 illustrates a local top view of another exemplary display panel consistent with various disclosed embodiments in the present disclosure.

FIG. 22 illustrates a local top view of another exemplary display panel provided by the present disclosure. As illustrated in FIG. 22, in one embodiment, the display panel may further include a plurality of scanning lines 24 and a plurality of data lines 25. The plurality of scanning lines 24 and the plurality of data lines 25 may define a plurality of pixel units 23. A driving signal line TX of a fingerprint recognition structure 100 may be multiplexed as a corresponding scanning line 24 of the plurality of scanning lines, and a sensing signal line RX of a fingerprint recognition structure 100 may be multiplexed as a corresponding data line 25 of the plurality of data lines. IN the present disclosure, a driving signal line may be multiplexed as a corresponding scanning line 24 of the plurality of scanning lines, and a sensing signal line RX may be multiplexed as a corresponding data line 25 of the plurality of data lines. Correspondingly a number of lines in the display panel may be reduced significantly. When driving, the plurality of scanning lines and the plurality of data lines may be multiplexed at different times in the fingerprint recognition period and in the display period. That is, in the display period, the plurality of scanning lines may be configured to transmit pixel scanning signals, and the plurality of data line may be configured to transmit pixel data signals; in the fingerprint recognition period, the plurality of scanning lines may be configured to transmit the driving signals, and the plurality of data lines may be configured to transmit the sensing signals.

Figure 23:
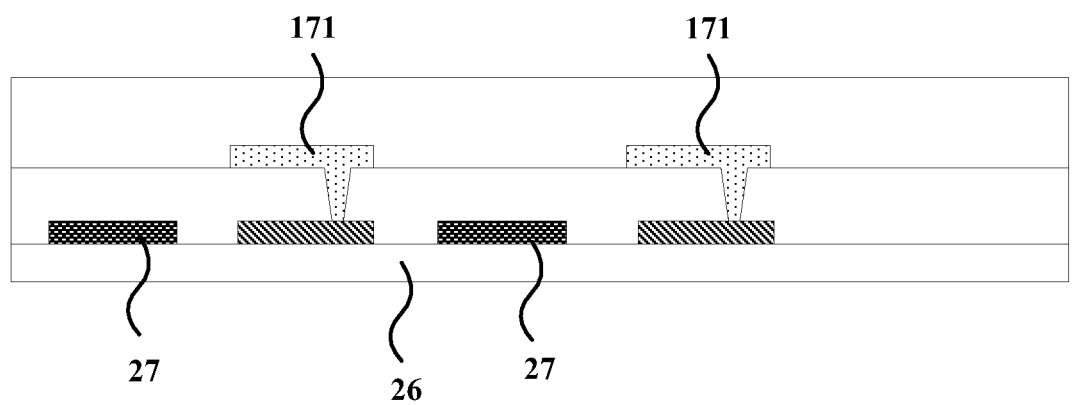
FIG. 23 illustrates a local cross-sectional view of another exemplary display panel consistent with various disclosed embodiments in the present disclosure.
Figure 32:
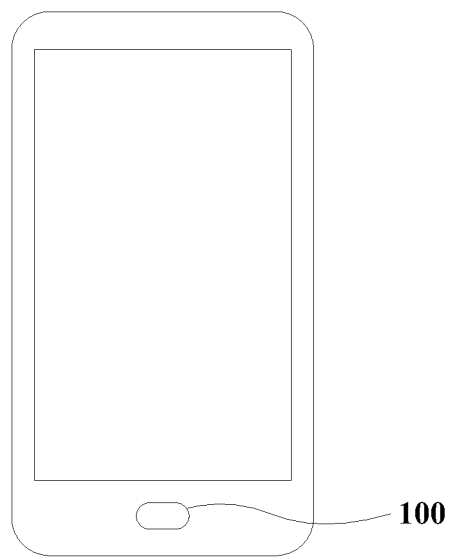
FIG. 32 illustrates another exemplary display device consistent with various disclosed embodiments in the present disclosure.

FIG. 23 illustrates a local cross-section view of another exemplary display panel provided by the present disclosure. As illustrated in FIG. 32, in one embodiment, the display panel may include a second substrate plate 26 and an array of pixel driving circuits 27. In one embodiment, the second substrate plate 26 may be a glass plate. The sensing electrodes 171 may be disposed at a side of the array of pixel driving circuits 27 away from the second substrate plate 26. A distance between the finger and a sensing electrode 171 may affect a number of the induced charges on the sensing electrode 171. If the distance between the finger and the sensing electrode 171 is too large, the number of the induced charges on the sensing electrode 171 by the finger may be not enough and the accuracy of the fingerprint recognition may be reduced. In the present disclosure, the sensing electrodes 171 may be disposed at a side of the array of pixel driving circuits 27 away from the second substrate plate 26. Correspondingly, the distance between the finger and the sensing electrode 171 may be reduced maximumly, and the accuracy of the fingerprint recognition may be improved. The present disclosure has no limit on positions of structures in the fingerprint recognition structure except the sensing electrode, including the fingerprint recognition driving transistor and the first capacitor in the fingerprint recognition structure.

In some embodiments, the sensing electrodes may be disposed at a same layer of the pixel electrodes of the plurality of pixel units or the common electrode.

Figure 24:
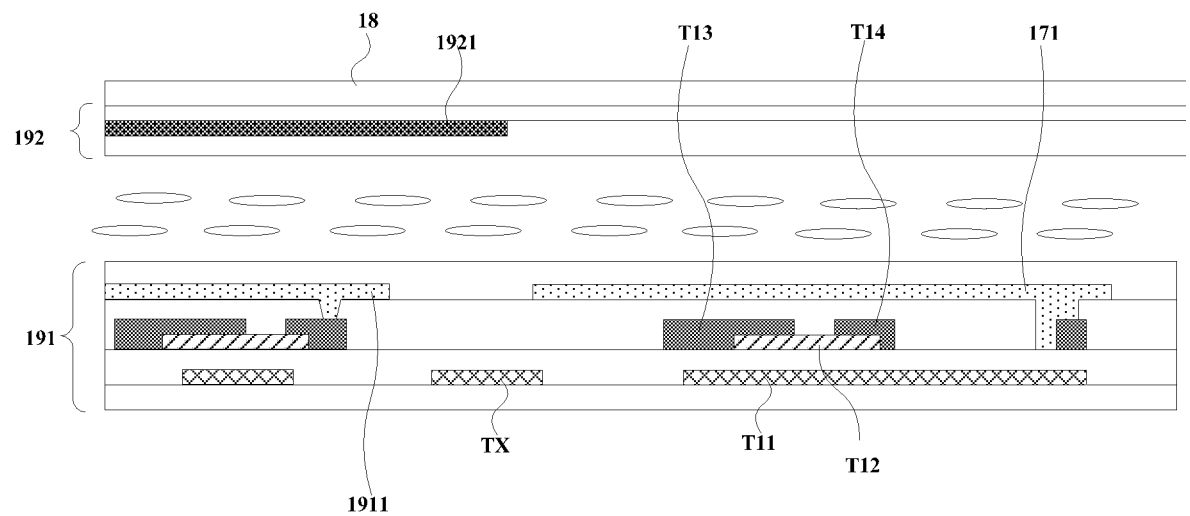
FIG. 24 illustrates another exemplary display panel consistent with various disclosed embodiments in the present disclosure.

FIG. 24 illustrates another display panel provided by an embodiment of the present disclosure. As illustrated in FIG. 24, in the TN-mode liquid crystal display panel, the sensing electrodes 171 may be disposed at the same layer of the pixel electrodes 1911 of the plurality of pixel units 23. A perpendicular projection of the common electrode 1921 on the plane of the display panel may expose perpendicular projections of the sensing electrodes 171 on the plane of the display panel, to prevent the common electrode from shielding the sensing electrodes 171 and from affecting the fingerprint recognition accuracy.

Figure 25:
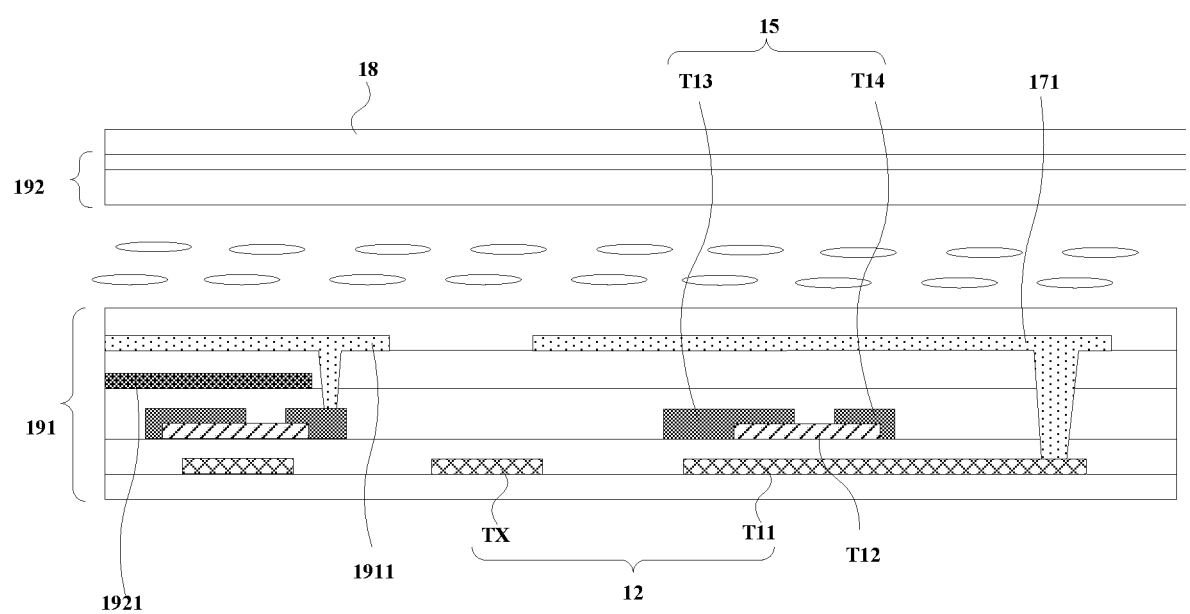
FIG. 25 illustrates another exemplary display panel consistent with various disclosed embodiments in the present disclosure.

FIG. 25 illustrates another display panel provided by an embodiment of the present disclosure. As illustrated in FIG. 25, the pixel electrodes 1911 and the common electrode 1911 of the plurality of pixel units 23 may be disposed at a same side of the array substrate plate 191, and the pixel electrodes 1911 may be disposed between the common electrode 1921 and a liquid crystal layer 30. That is, the liquid crystal may be driven by a planar electric field mode to rotate. Correspondingly, the pixel electrodes 1911 may be configured to form a plurality of bar-shaped electrodes (not shown in the figures). The sensing electrodes 171 may be disposed at the same layer of the pixel electrodes 1911 of the plurality of pixel units 23.

Figure 26:
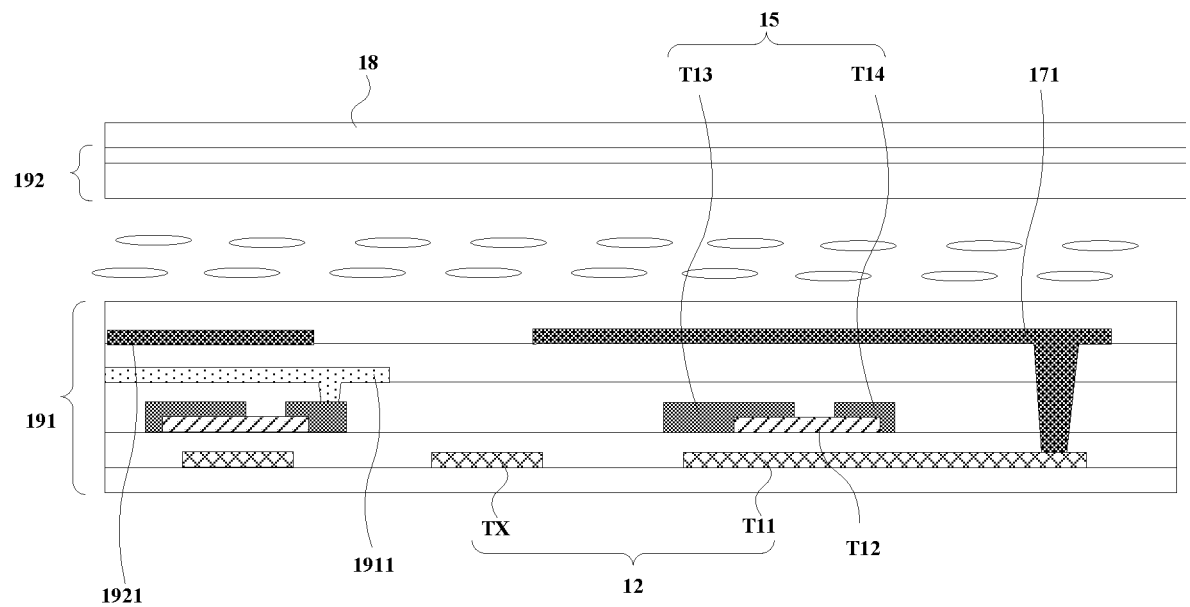
FIG. 26 illustrates another exemplary display panel consistent with various disclosed embodiments in the present disclosure.

FIG. 26 illustrates another display panel provided by an embodiment of the present disclosure. As illustrated in FIG. 26, the pixel electrodes 1911 and the common electrode 1911 of the plurality of pixel units 23 may be disposed at a same side of the array substrate plate 191, and the common electrode 1921 may be disposed between the pixel electrodes 1911 and a liquid crystal layer 30. Correspondingly, the common electrode 1921 may be configured to form a plurality of bar-shaped electrodes (not shown in the figures) by opening slits. The sensing electrodes 171 may be disposed at the same layer of the common electrode 1921 of the plurality of pixel units 23.

Figure 27:
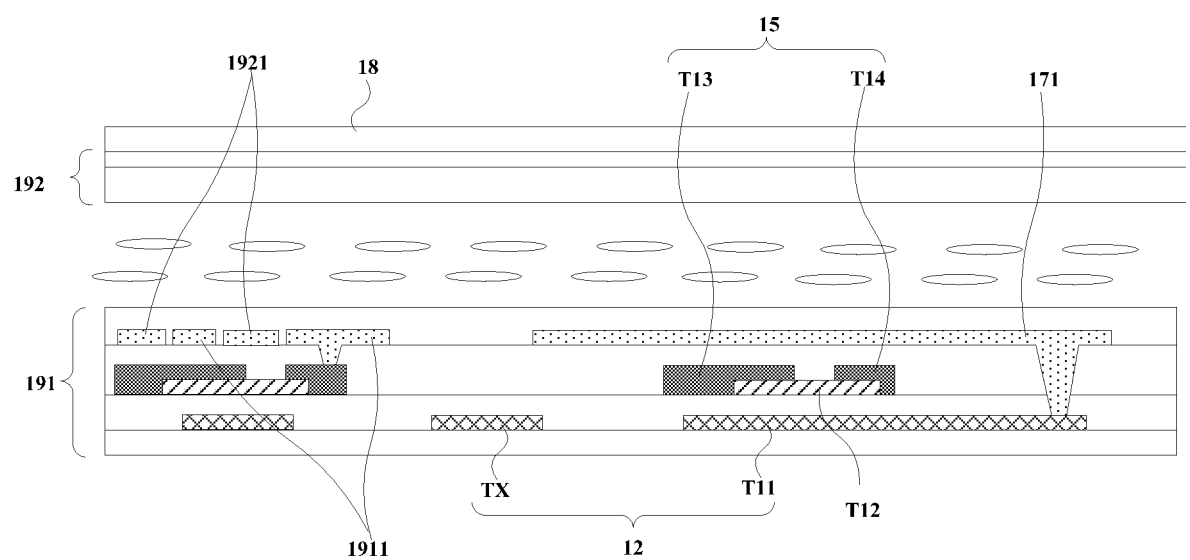
FIG. 27 illustrates another exemplary display panel consistent with various disclosed embodiments in the present disclosure.

FIG. 27 illustrates another display panel provided by an embodiment of the present disclosure. As illustrated in FIG. 27, the pixel electrodes 1911 and the common electrode 1911 of the plurality of pixel units 23 may be disposed in the array substrate plate 191. The pixel electrodes 1911 and the common electrode 1911 of the plurality of pixel units 23 may be disposed in a same layer. The sensing electrodes 171 may be disposed at the same layer of the common electrode 1921 or the pixel electrodes 1911 of the plurality of pixel units 23.

Shielding of the sensing electrodes by other conducting film layers may induce failure or reduced sensitivity of the fingerprint recognition. To ensure that the sensing electrodes are not shielded by other conducting film layers, in the present disclosure, the sensing electrodes may be disposed at a same layer of a conducting film layer of the display panel closest to the light-emitting side.

In some embodiments of the present disclosure, the pixel electrodes or the common electrode of the plurality of pixel units may be multiplexed as the sensing electrodes. In one embodiment where the pixel electrodes 1911 and the common electrode 1911 of the plurality of pixel units 23 may be disposed at a same side of the array substrate plate 191, electrodes (of the pixel electrodes or the common electrodes) closest to the light-emitting side of the display panel may be multiplexed as the sensing electrodes.

Figure 28:
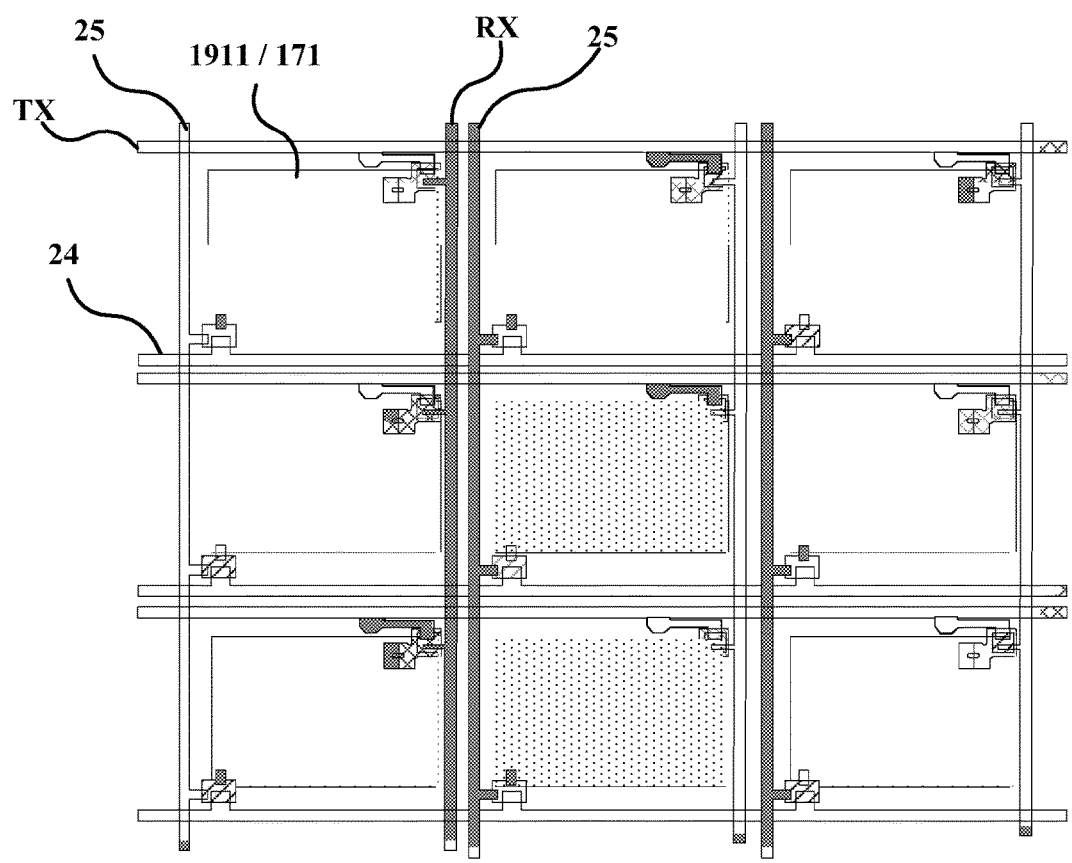
FIG. 28 illustrates another exemplary display panel consistent with various disclosed embodiments in the present disclosure.

FIG. 28 illustrates another display panel provided by an embodiment of the present disclosure. As illustrated in FIG.

28, the pixel electrodes 1911 may be multiplexed as the sensing electrodes 171. The sensing electrodes 171 may be timely multiplexed in the fingerprint recognition period and in the display period. That is, in the display period, data signals may be transmitted to the sensing electrodes through the data lines; in the fingerprint recognition period, driving signals may be transmitted to the sensing electrodes through the driving signal lines. In the present disclosure, the pixel electrodes or the common electrode of the plurality of pixel units may be multiplexed as the sensing electrodes. Correspondingly, an individual process for forming the sensing electrodes may be avoided, a number of the fabrication processes may be reduced. A production efficiency may be improved, and a cost may be reduced. A thickness of the display panel may also be reduced.

Figure 29:
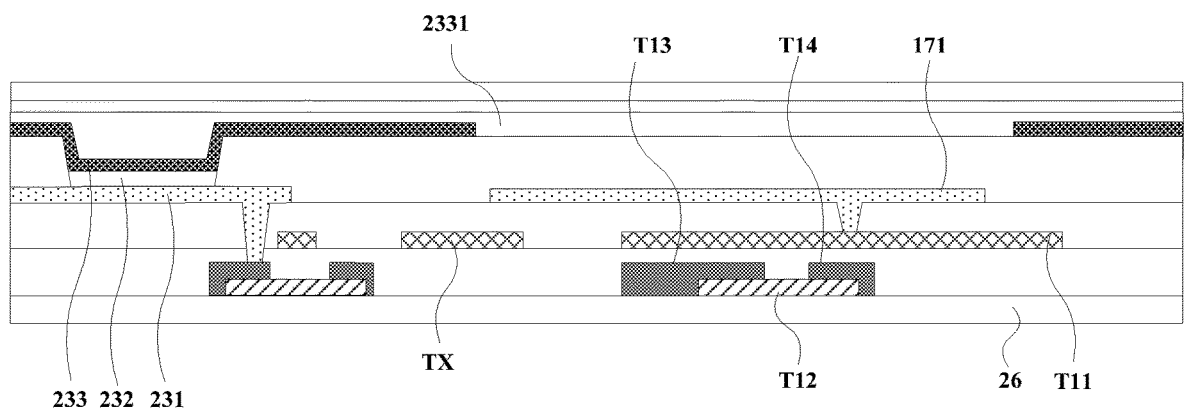
FIG. 29 illustrates another exemplary display panel consistent with various disclosed embodiments in the present disclosure.

The present disclosure also provides an organic light-emitting display panel. FIG. 29 illustrates another display panel provided by an embodiment of the present disclosure. As illustrated in FIG. 29, the display panel may include a plurality of pixel units 23. Each of the plurality of pixel units 23 may include an anode 231, a light-emitting function layer 232, and a cathode 233. The sensing electrodes 171 may be disposed at a same layer of anodes 231 of the plurality of pixel units 23. The cathode 233 may include a hollow structure 2331. A perpendicular projection of a sensing electrode 171 on the second substrate plate 26 may be located inside a perpendicular projection of a corresponding hollow structure 2331 on the second substrate plate 26. Since cathodes of the plurality of pixel units may have a whole surface structure. To prevent the cathodes from shielding the sensing electrodes, hollow structures may be formed in the cathodes to expose the sensing electrodes. For description purposes only, the embodiment in FIG. 29 where each transistor in the display panel has a top-gate structure is used as an example to illustrate the present disclosure, and should not limit the scopes of the present disclosure. In some other embodiments, a transistor in the display panel may have a bottom-gate structure.

In some embodiments, structures in the fingerprint recognition structure including transistors and capacitors may be disposed at a same layer of a pixel driving circuit array for driving the plurality of pixel units in the display panel to display. Correspondingly, a mask for forming the pixel driving circuit array may be also used to form the structures in the fingerprint recognition structure including transistors and capacitors. Fabrication processes may be simplified, and the thickness of the display panel may be reduced.

In some embodiments, the plurality of driving signal lines TX may be disposed in a same layer of the scanning lines and parallel to the scanning lines. The plurality of sensing signal lines RX may be disposed at a same layer of the data lines and parallel to the data lines. Correspondingly, the plurality of driving signal lines TX and the scanning lines may be formed in a same process by using a same mask, same methods and same materials. The plurality of sensing signal lines RX and the data lines may be formed in a same process by using a same mask, same methods and same materials. In some other embodiments, the plurality of driving signal lines TX may be disposed in a layer different from the scanning lines and the plurality of sensing signal lines RX may be disposed at a layer different from the data lines. Perpendicular projections of the plurality of driving signal lines TX on the second substrate plate may overlap perpendicular projections of the scanning lines on the second substrate plate, and perpendicular projections of the plurality of sensing signal lines TX on the second substrate plate may overlap perpendicular projections of the data lines on the second substrate plate. Wiring spaces on the display panel may be saved, gaps between the plurality of pixel units may be reduced, and a transmittance of the display panel may be improved.

Figure 30:
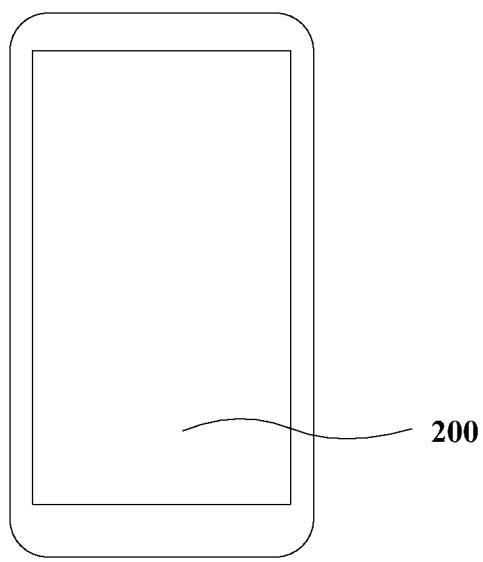
FIG. 30 illustrates an exemplary display device consistent with various disclosed embodiments in the present disclosure.

The present disclosure also provides a display device. FIG. 30 illustrates a display device consistent with various embodiments of the present disclosure. The display device may include a display panel 200 provided by various embodiments of the present disclosure. The display device may be a cell phone, a computer, a smart wearable device (such as a smartwatch). The present disclosure has no limit on this.

Figure 31:
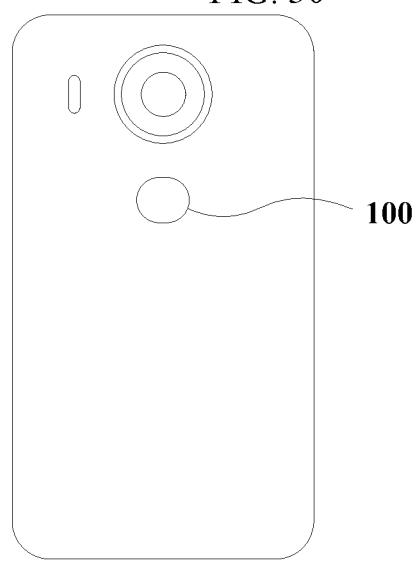
FIG. 31 illustrates another exemplary display device consistent with various disclosed embodiments in the present disclosure.

In some embodiments of the present disclosure, as illustrated in FIG. 31, the fingerprint recognition structure may be disposed at a surface away from the light-emitting surface of the display panel. That is, the fingerprint recognition structure 100 may be disposed at a back surface of the display panel. In other embodiments, the fingerprint recognition structure 100 may be disposed at a side surface of the display panel.

In some embodiments, the display panel may include a display region AA and a non-display region UA, as illustrated in FIG. 32. The fingerprint recognition structure 100 may be disposed in the non-display region UA and at a surface of the display panel at the light-emitting surface.

Figure 33:
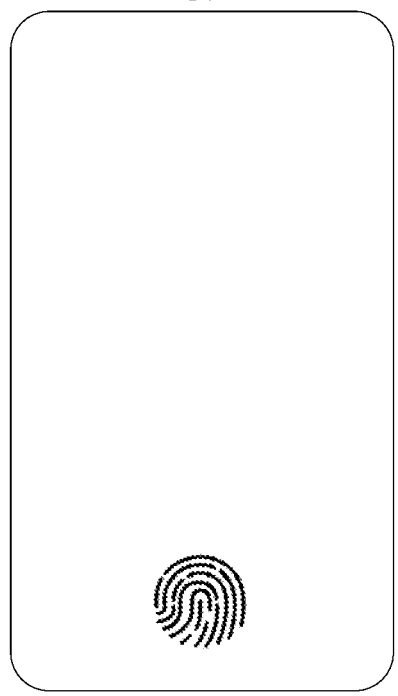
FIG. 33 illustrates another exemplary display device consistent with various disclosed embodiments in the present disclosure.

In some other embodiments, the display panel may include a display region AA and a non-display region UA, as illustrated in FIG. 33. The fingerprint recognition structure 100 may be disposed in the display region AA and at a side of the light-emitting surface of the display panel. In the embodiment of the present disclosure, the fingerprint recognition structure may be hidden in the display region of the display panel to realize under-screen fingerprint recognition. Compared with existing fingerprint modules with built-in fingerprint sensor chips in the silicon-based optical fingerprint technology, the display device provided by the embodiments of the present disclosure may not need to attach the fingerprint recognition structure under the display panel or fix the fingerprint recognition structure on a middle frame of the display device. Therefore, the fingerprint recognition structure may not occupy the surface space or area of the display panel, so that the screen ratio may be improved. Since the existing silicon-based optical fingerprint technology requires a silicon-based fingerprint identification chip, for cost and reliability reasons, it is generally only suitable for realizing small-area fingerprint recognition at a fixed location, but cannot realize large-area fingerprint recognition. Also, the silicon base is difficult to integrate into the screen, which limits its application. Compared with the solution of embedding the fingerprint recognition structure on the front Home button or the back of the device body, the under-screen fingerprint recognition of the display device provided by the embodiments of the present disclosure may increase the screen ratio of the display panel, which is more in line with the current development trend of full screens.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

In the present disclosure, the fingerprint recognition circuit may include the fingerprint recognition driving transistor, the first capacitor, the driving signal input terminal, and the sensing signal output terminal. The plate of the first capacitor electrically connected to the gate of the fingerprint recognition driving transistor may be used to detect the induced charges when the bridges and valleys of the finger touch. Since the bridges and valleys of the finger may induce different numbers of the induced charges, the bridges and valleys of the finger may have different effects on the conducting resistance of the source layer of the fingerprint recognition driving transistor. Correspondingly, by inputting the driving signals through the driving signal input terminal, magnitudes of the sensing signals through the sensing signal output terminal may be different and the bridges and valleys of the finger may be detected. The fingerprint recognition circuit provided by the present disclosure may have a simple structure and may be formed independently from the silicon-based materials. Correspondingly, the fingerprint recognition circuit may have a low cost and may be suitable for requirements of large-area fingerprint recognition.

Various embodiments have been described to illustrate the operation principles and exemplary implementations. It should be understood by those skilled in the art that the present disclosure is not limited to the specific embodiments described herein and that various other obvious changes, rearrangements, and substitutions will occur to those skilled in the art without departing from the scope of the disclosure. Thus, while the present disclosure has been described in detail with reference to the above described embodiments, the present disclosure is not limited to the above described embodiments, but may be embodied in other equivalent forms without departing from the scope of the present disclosure, which is determined by the appended claims.

What is claimed is:

1. A fingerprint recognition structure, comprising fingerprint
   recognition circuits, wherein:
   each of the fingerprint recognition circuits includes:
      a fingerprint recognition driving transistor;
      a first capacitor;
      a second capacitor;
      a driving signal input terminal; and
      a sensing signal output terminal,
      wherein:
         the first capacitor has a terminal electrically connected to a gate of the fingerprint recognition driving transistor and another terminal electrically connected to a ground;
         the fingerprint recognition driving transistor has an input terminal electrically connected to the driving signal input terminal, and an output terminal electrically connected to the sensing signal output terminal; and
         the second capacitor has two terminals electrically connected to the driving signal input terminal and the gate of the fingerprint recognition driving transistor, respectively;
   a first substrate plate;
   a plurality of driving signal lines arranged in rows;
   a plurality of sensing signal lines arranged in columns;
   a first conducting layer, wherein a gate of a fingerprint recognition transistor in each of the fingerprint recognition circuits and the plurality of driving signal lines are disposed in the first conducting layer;
   a first insulating layer at a side of the first conducting layer;
   a first semiconductor layer at a side of the first insulating layer away from the first conducting layer, wherein a source layer of the fingerprint recognition transistor in each of the fingerprint recognition circuits is disposed in the first semiconductor layer;
   a second conducting layer at a side of the first semiconductor layer away from the first insulating layer, wherein the plurality of sensing signal lines, the input terminal and the output terminal of the fingerprint recognition transistor in each of the fingerprint recognition circuits are disposed in the second conducting layer;
   a second insulating layer at a side of the second conducting layer away from the first insulating layer; and
   a third conducting layer at a side of the second insulating layer away from the second conducting layer, wherein the third conducting layer includes sensing electrodes and one of the sensing electrodes is a plate of a first capacitor electrically connected to a gate of a fingerprint recognition driving transistor in a corresponding one of the fingerprint recognition circuits.

2. The fingerprint recognition structure according to claim 1,
   wherein:
   the plurality of driving signal lines and the plurality of sensing signal lines are disposed on a side of the first substrate plate;
   the plurality of driving signal lines crosses the plurality of sensing signal lines, to define a plurality of fingerprint recognition units;
   each of the plurality of fingerprint recognition units includes one of the fingerprint recognition circuits;
   a fingerprint recognition driving transistor in one of the fingerprint recognition circuits has an input terminal electrically connected to one of the plurality of driving signal lines in a corresponding row, and an output terminal electrically connected to one of the plurality of sensing signal lines in a corresponding column.

3. The fingerprint recognition structure according to claim 2, wherein:
   in each of the fingerprint recognition circuits, a sensing electrode is a plate of the first capacitor electrically connected to the gate of the fingerprint recognition driving transistor; and
   the sensing electrode does not overlap the plurality of driving signal lines, and/or the sensing electrode does not overlap the plurality of sensing signal lines.

4. The fingerprint recognition structure according to claim 1, wherein each of the
   fingerprint recognition circuits further includes an initialization transistor, wherein:
   an output terminal of the initialization transistor is electrically connected to the gate of the fingerprint recognition driving transistor in the fingerprint recognition circuit.

5. The fingerprint recognition structure according to claim 4, wherein each of the fingerprint recognition circuits further includes a plurality of fingerprint recognition circuits configured in an array to form a fingerprint recognition sensor, wherein:
   a control terminal of an initialization transistor of one of the fingerprint recognition circuits in an i-th row is electrically connected to a driving signal input terminal of one of the fingerprint recognition circuits in an (i-1)-th row, wherein i is a positive integer larger than or equal to 2.

6. The fingerprint recognition structure according to claim 5, wherein:
a common initialization signal is input to an input terminal of an initialization transistor of each of the fingerprint recognition circuits.

7. The fingerprint recognition structure according to claim 5, wherein an input terminal of the initialization transistor of each of the fingerprint recognition circuits is electrically connected to a driving signal input terminal of one of the fingerprint recognition circuits in a same row.

8. A fingerprint recognition structure, comprising fingerprint
recognition circuits, wherein:
each of the fingerprint recognition circuits includes:
a fingerprint recognition driving transistor;
a first capacitor;
a second capacitor;
a driving signal input terminal; and
a sensing signal output terminal,
wherein:
the first capacitor has a terminal electrically connected to a gate of the fingerprint recognition driving transistor and another terminal electrically connected to a ground;
the fingerprint recognition driving transistor has an input terminal electrically connected to the driving signal input terminal, and an output terminal electrically connected to the sensing signal output terminal; and
the second capacitor has two terminals electrically connected to the driving signal input terminal and the gate of the fingerprint recognition driving transistor, respectively;
a first substrate plate;
a plurality of driving signal lines arranged in rows;
a plurality of sensing signal lines arranged in columns;
a first semiconductor layer, wherein a source layer of a fingerprint recognition driving transistor in each of the fingerprint recognition circuits is disposed in the first semiconductor layer;
a first conducting layer on the first semiconductor layer, wherein the plurality of sensing signal lines, the input terminal and the output terminal of the fingerprint recognition transistor in each of the fingerprint recognition circuits are disposed in the second conducting layer;
a first insulating layer at a side of the first conducting layer away from the first semiconductor layer; and
a second conducting layer, wherein:
a gate of a fingerprint recognition transistor in each of the fingerprint recognition circuits and the plurality of driving signal lines are disposed in the second conducting layer;
the gate of the fingerprint recognition transistor in each of the fingerprint recognition circuits is multiplexed as a sensing electrode; and
the sensing electrode is a plate of a corresponding first capacitor electrically connected to a gate of a fingerprint recognition driving transistor in a corresponding one of the fingerprint recognition circuits.

9. The fingerprint recognition structure according to claim 8, wherein:

the plurality of driving signal lines and the plurality of sensing signal lines are disposed on a side of the first substrate plate;
the plurality of driving signal lines crosses the plurality of sensing signal lines, to define a plurality of fingerprint recognition units;
each of the plurality of fingerprint recognition units includes one of the fingerprint recognition circuits;
a fingerprint recognition driving transistor in one of the fingerprint recognition circuits has an input terminal electrically connected to one of the plurality of driving signal lines in a corresponding row, and an output terminal electrically connected to one of the plurality of sensing signal lines in a corresponding column.

10. The fingerprint recognition structure according to claim 9, wherein:
in each of the fingerprint recognition circuits, a sensing electrode is a plate of the first capacitor electrically connected to the gate of the fingerprint recognition driving transistor; and
the sensing electrode does not overlap the plurality of driving signal lines, and/or the sensing electrode does not overlap the plurality of sensing signal lines.

11. The fingerprint recognition structure according to claim 8, wherein each of the
fingerprint recognition circuits further includes an initialization transistor, wherein:
an output terminal of the initialization transistor is electrically connected to the gate of the fingerprint recognition driving transistor in the fingerprint recognition circuit.

12. The fingerprint recognition structure according to claim 11, wherein each of the fingerprint recognition circuits further includes a plurality of fingerprint recognition circuits configured in an array to form a fingerprint recognition sensor, wherein:
a control terminal of an initialization transistor of one of the fingerprint recognition circuits in an i-th row is electrically connected to a driving signal input terminal of one of the fingerprint recognition circuits in an (i-1)-th row, wherein i is a positive integer larger than or equal to 2.

13. The fingerprint recognition structure according to claim 12, wherein:
a common initialization signal is input to an input terminal of an initialization transistor of each of the fingerprint recognition circuits.

14. The fingerprint recognition structure according to claim 12, wherein an input terminal of the initialization transistor of each of the fingerprint recognition circuits is electrically connected to a driving signal input terminal of one of the fingerprint recognition circuits in a same row.

15. A fingerprint recognition structure, comprising fingerprint
recognition circuits, wherein:
each of the fingerprint recognition circuits includes:
a fingerprint recognition driving transistor;
a first capacitor;
a second capacitor;
a driving signal input terminal; and
a sensing signal output terminal,
wherein:
the first capacitor has a terminal electrically connected to a gate of the fingerprint recognition driving transistor and another terminal electrically connected to a ground;

the fingerprint recognition driving transistor has an input terminal electrically connected to the driving signal input terminal, and an output terminal electrically connected to the sensing signal output terminal; and the second capacitor has two terminals electrically connected to the driving signal input terminal and the gate of the fingerprint recognition driving transistor, respectively;

a first substrate plate;

a plurality of driving signal lines arranged in rows;

a plurality of sensing signal lines arranged in columns; the fingerprint recognition structure according to claim 2, further including:

a first semiconductor layer, wherein a source layer of a fingerprint recognition driving transistor in each of the fingerprint recognition circuits is disposed in the first semiconductor layer;

a first conducting layer on the first semiconductor layer, wherein the plurality of sensing signal lines, the input terminal and the output terminal of the fingerprint recognition transistor in each of the fingerprint recognition circuits are disposed in the second conducting layer;

a first insulating layer at a side of the first conducting layer away from the first semiconductor layer;

a second conducting layer, wherein a gate of a fingerprint recognition transistor in each of the fingerprint recognition circuits and the plurality of driving signal lines are disposed in the second conducting layer;

a second insulating layer at a side of the second conducting layer away from the first insulating layer; and a third conducting layer at a side of the second insulating layer away from the second conducting layer, wherein the third conducting layer includes sensing electrodes and one of the sensing electrodes is a plate of a first capacitor electrically connected to a gate of a fingerprint recognition driving transistor in a corresponding one of the fingerprint recognition circuits.

16. The fingerprint recognition structure according to claim 15, wherein:

the plurality of driving signal lines and the plurality of sensing signal lines are disposed on a side of the first substrate plate;

the plurality of driving signal lines crosses the plurality of sensing signal lines, to define a plurality of fingerprint recognition units;

each of the plurality of fingerprint recognition units includes one of the fingerprint recognition circuits;

a fingerprint recognition driving transistor in one of the fingerprint recognition circuits has an input terminal electrically connected to one of the plurality of driving signal lines in a corresponding row, and an output terminal electrically connected to one of the plurality of sensing signal lines in a corresponding column.

17. The fingerprint recognition structure according to claim 16, wherein:

in each of the fingerprint recognition circuits, a sensing electrode is a plate of the first capacitor electrically connected to the gate of the fingerprint recognition driving transistor; and the sensing electrode does not overlap the plurality of driving signal lines, and/or the sensing electrode does not overlap the plurality of sensing signal lines.

18. The fingerprint recognition structure according to claim 15, wherein each of the fingerprint recognition circuits further includes an initialization transistor, wherein:

an output terminal of the initialization transistor is electrically connected to the gate of the fingerprint recognition driving transistor in the fingerprint recognition circuit.

19. The fingerprint recognition structure according to claim 18, wherein each of the fingerprint recognition circuits further includes a plurality of fingerprint recognition circuits configured in an array to form a fingerprint recognition sensor, wherein:

a control terminal of an initialization transistor of one of the fingerprint recognition circuits in an i-th row is electrically connected to a driving signal input terminal of one of the fingerprint recognition circuits in an (i-1)-th row, wherein i is a positive integer larger than or equal to 2.

* * * * *